(12) United States Patent
Zeviar et al.

(10) Patent No.: US 11,635,124 B2
(45) Date of Patent: Apr. 25, 2023

(54) HELICAL DRIVE MECHANISM AND HANDLE MECHANISM FOR WHEELCHAIR WITH HELICAL DRIVE

(71) Applicant: Z-One and Only Technology Inc., Calgary (CA)

(72) Inventors: Zale Zeviar, Calgary (CA); Ben Millen, Calgary (CA)

(73) Assignee: Z-One and Only Technology Inc., Calgary (CA)

( * ) Notice: Subject to any disclaimer, the term of this patent is extended or adjusted under 35 U.S.C. 154(b) by 356 days.

(21) Appl. No.: 16/925,681

(22) Filed: Jul. 10, 2020

(65) Prior Publication Data

US 2021/0010575 A1    Jan. 14, 2021

Related U.S. Application Data

(60) Provisional application No. 62/965,051, filed on Jan. 23, 2020, provisional application No. 62/873,734, filed on Jul. 12, 2019.

(51) Int. Cl.
*F16H 25/12*    (2006.01)
*A61G 5/02*    (2006.01)

(52) U.S. Cl.
CPC ............. *F16H 25/12* (2013.01); *A61G 5/021* (2013.01); *A61G 5/025* (2013.01)

(58) Field of Classification Search
CPC .................................. F16H 25/12; A61G 5/025
USPC ........................................................... 74/89
See application file for complete search history.

(56) References Cited

U.S. PATENT DOCUMENTS

| 6,213,487 B1 * | 4/2001 | Doroftei | B62K 3/005 |
|---|---|---|---|
|  |  |  | 280/252 |
| 9,303,738 B1 * | 4/2016 | Bombardo | F16H 25/12 |

FOREIGN PATENT DOCUMENTS

| WO | WO-9844783 A2 * | 10/1998 | ........... A01K 89/015 |
|---|---|---|---|
| WO | WO-9845167 A1 * | 10/1998 | ........... A01K 89/015 |
| WO | WO-9845621 A1 * | 10/1998 | ........... A01K 89/015 |

* cited by examiner

*Primary Examiner* — Amy R Weisberg
*Assistant Examiner* — Hilary L Johns
(74) *Attorney, Agent, or Firm* — Greenberg Traurig, LLP

(57) ABSTRACT

A device including a frame; an actuator attached to the frame and slidaby movable with respect to the frame along a linear axis, and a helical member positioned within the frame and rotatably movable with respect to the frame about a helical axis of the helical member, wherein the helical axis is parallel to the linear axis, wherein the actuator and the helical member are configured to cooperate with one another such that (a) motion of the actuator along the linear axis in a first linear direction causes corresponding rotation of the helical member about the helical axis in a first rotational direction and (b) motion of the actuator along the linear axis in a second linear direction that is opposite the first linear direction causes corresponding rotation of the helical member about the helical axis in a second rotational direction that is opposite the first rotational direction.

13 Claims, 27 Drawing Sheets

Figure 3A                    Figure 3B

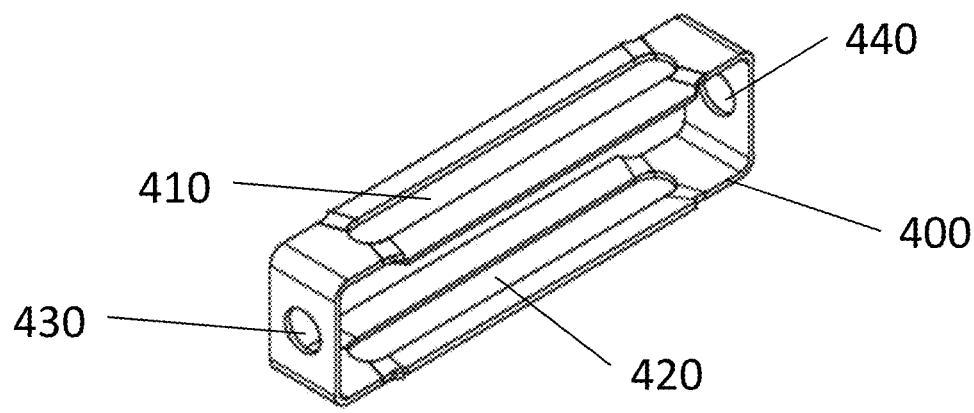
Figure 4A
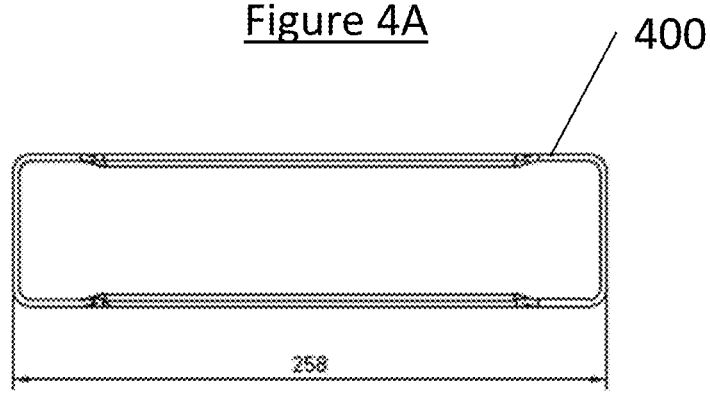
Figure 4B
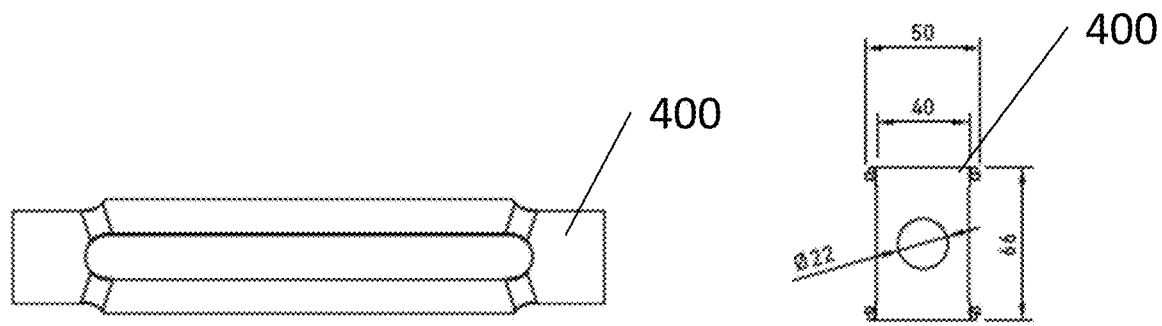
Figure 4C
Figure 4D

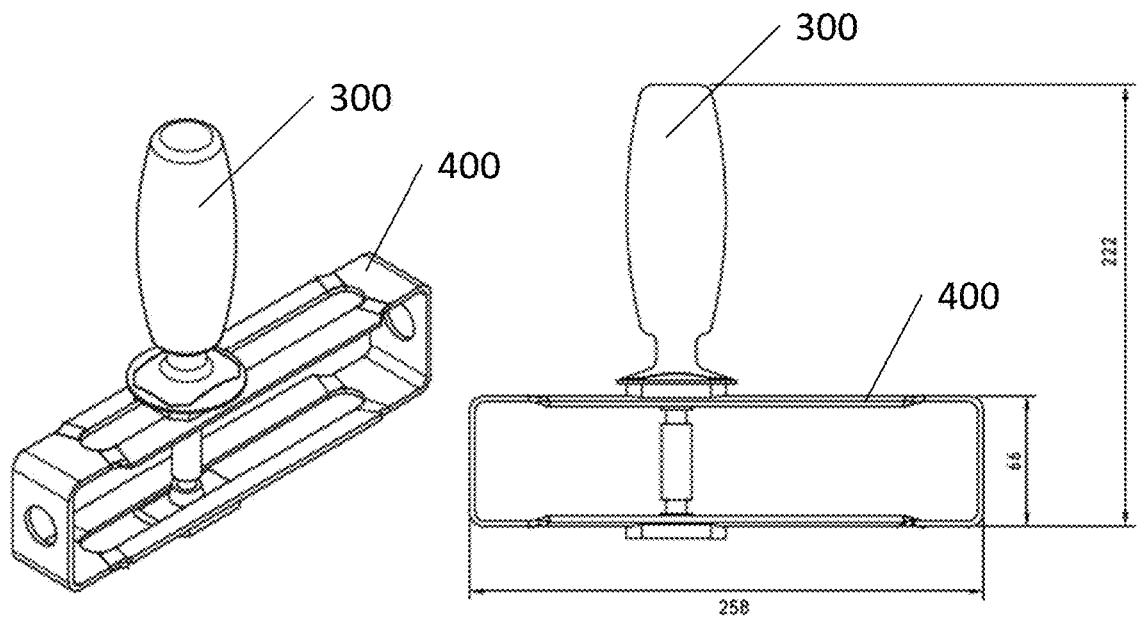
Figure 5A
Figure 5B
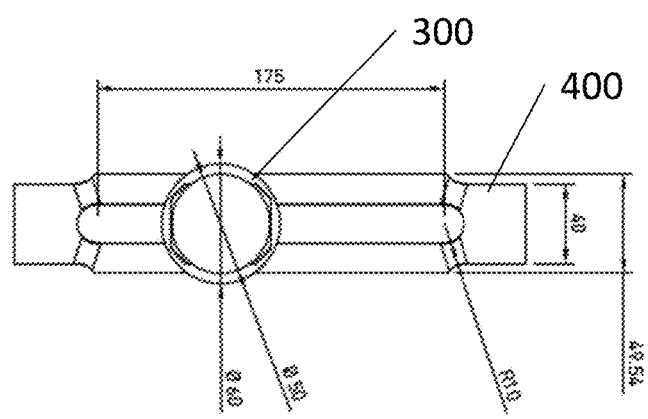
Figure 5C
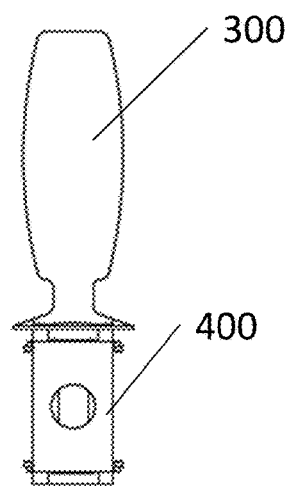
Figure 5D

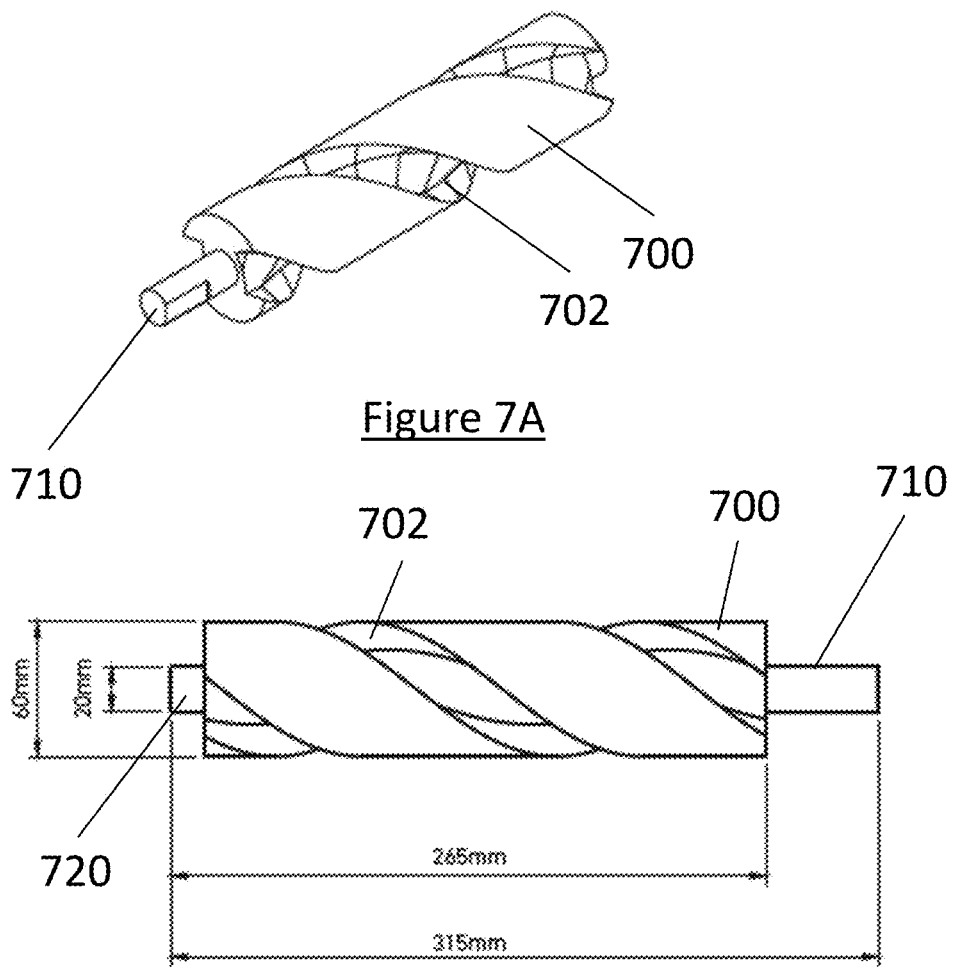
Figure 7A
Figure 7B
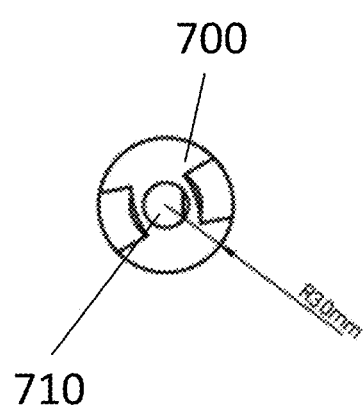
Figure 7C

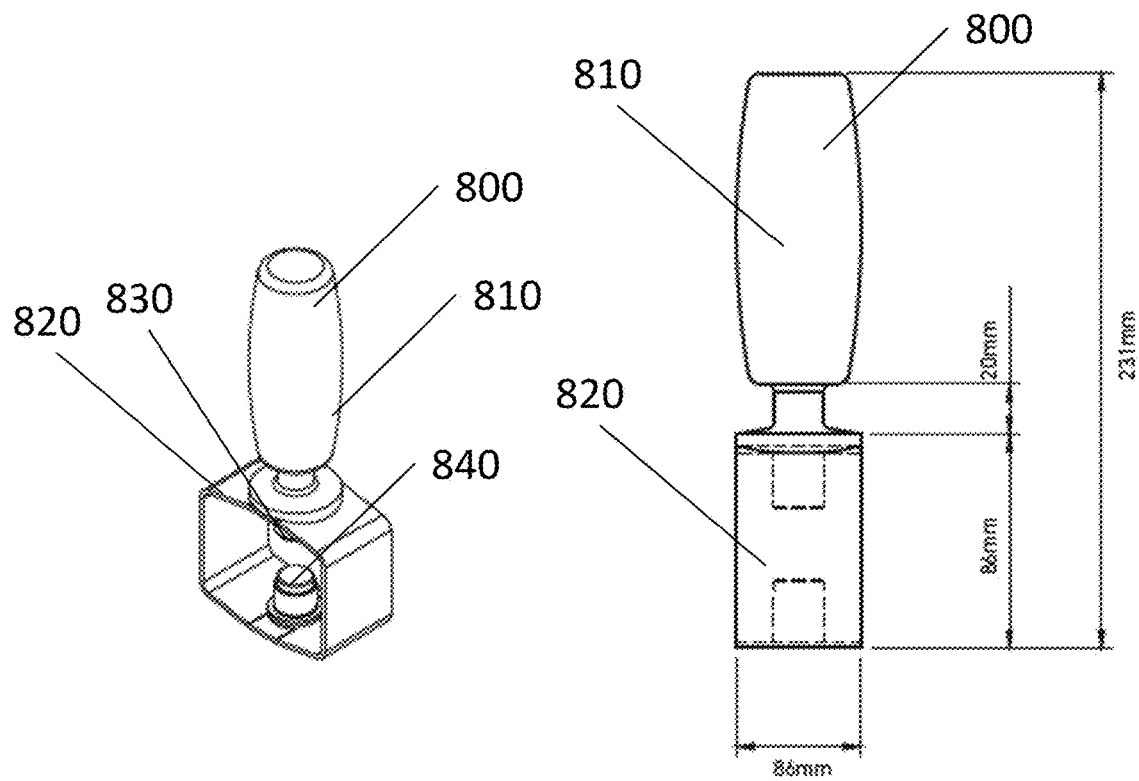
Figure 8A
Figure 8B
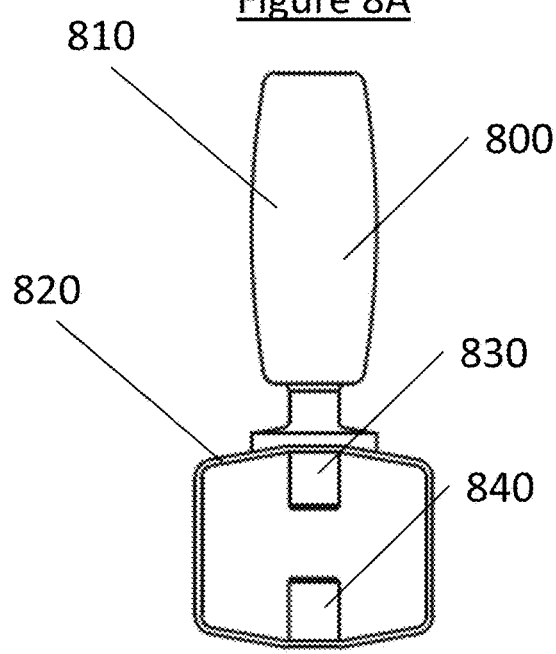
Figure 8C
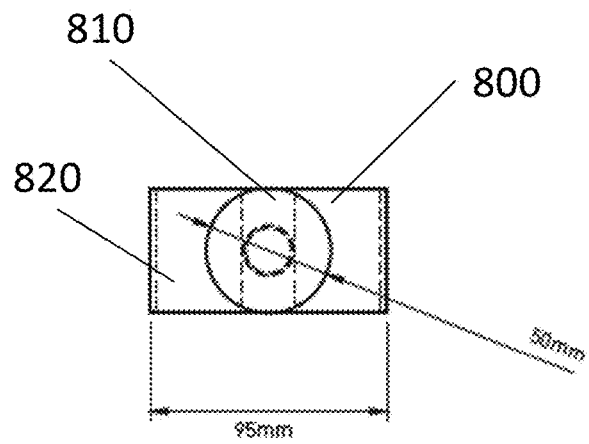
Figure 8D

HELICAL DRIVE MECHANISM AND HANDLE MECHANISM FOR WHEELCHAIR WITH HELICAL DRIVE

CROSS-REFERENCE TO RELATED APPLICATIONS

This application is a Section 111(a) application relating to and claiming the benefit of commonly-owned, co-pending U.S. Provisional Patent Application No. 62/873,734, filed Jul. 12, 2020, entitled HELICAL DRIVE MECHANISM, and U.S. Provisional Patent Application No. 62/965,051, filed Jan. 23, 2020, entitled HANDLE MECHANISM FOR WHEELCHAIR WITH HELICAL DRIVE, the contents of both of which are incorporated herein by reference in their entirety.

FIELD OF THE INVENTION

The field of invention relates to human-powered drive mechanisms. More particularly, the field of invention relates to control mechanisms for human-powered drive mechanisms that are operable to convert a linear input force to a helical drive torque through the use of a helical element.

BACKGROUND OF THE INVENTION

Vehicles and other human-powered devices that are driven by a rotational drive torque are known. However, such devices are inefficient and require the application of human input power in a manner that may not be biomechanically desirable.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

FIG. 3A shows a perspective view of an actuator handle of the helical drive of FIG. 1A;
FIG. 3B shows a side view of the actuator handle of FIG. 3A;
FIG. 4A shows a perspective view of a frame of the helical drive of FIG. 1A;
FIG. 4B shows a side view of the frame of FIG. 4A;
FIG. 4C shows a top view of the frame of FIG. 4A;
FIG. 4D shows a front view of the frame of FIG. 4A;
FIG. 5A shows a perspective view of a subassembly including the actuator handle of FIG. 3A and the frame of FIG. 4A;
FIG. 5B shows a side view of the subassembly of FIG. 5A;
FIG. 5C shows a top view of the subassembly of FIG. 5A;
FIG. 5D shows a front view of the subassembly of FIG. 5A;
FIG. 7A shows a perspective view of a helical member of the helical drive of FIG. 6A;
FIG. 7B shows a side view of the helical member of FIG. 7A;
FIG. 7C shows a front view of the helical member of FIG. 7A;
FIG. 8A shows a perspective view of an actuator handle of the helical drive of FIG. 6A;
FIG. 8B shows a side view of the actuator handle of FIG. 8A;
FIG. 8C shows a front view of the actuator handle of FIG. 8A;
FIG. 8D shows a top view of the actuator handle of FIG. 8A.

SUMMARY OF THE INVENTION

Figure 1A:
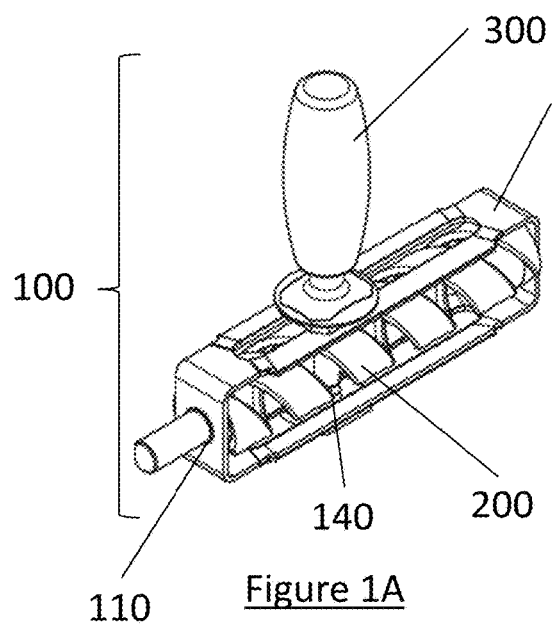
FIG. 1A shows a perspective view of a first exemplary embodiment of a helical drive.

The exemplary embodiments relate to a helical drive suitable for use in human-powered vehicles and similar devices, and operable to receive linear force and motion as an input and provide torque as an output.

In an embodiment, a helical drive includes a frame, a handle actuator attached to the frame and slidaby movable along the frame along a linear axis, and a helical member positioned within the frame and rotatably movable within the frame about a longitudinal axis parallel to the linear axis, whereby motion of the handle actuator along the linear axis causes corresponding rotation of the helical member about the longitudinal axis. In some embodiments, the helical drive includes at least one follower bearing positioned on a portion of the handle actuator so as to reduce friction between the handle actuator and the helical member. In some embodiments, the helical drive includes at least one plain bearing positioned on a portion of the frame so as to reduce friction between the helical member and the frame. In some embodiments, the helical member has a helical pitch of between 85 millimeters and 95 millimeters. In some embodiments, the helical member has a lead angle of between 24 degrees and 27 degrees. In some embodiments, the helical member has a pitch diameter of between 48 millimeters and 52 millimeters.

In an embodiment, a helical drive system includes a helical drive, a flexible drive shaft, and a freewheel, wherein the helical drive includes a frame, a handle actuator attached to the frame and slidaby movable along the frame along a linear axis, and a helical member positioned within the frame and rotatably movable within the frame about a longitudinal axis parallel to the linear axis, whereby motion of the handle actuator along the linear axis causes corresponding rotation of the helical member about the longitudinal axis, wherein the flexible drive shaft is coupled to the helical member such that rotation of the helical member causes corresponding rotation of the flexible drive shaft, and wherein the flexible drive shaft is coupled to the freewheel. In some embodiments, the helical drive includes at least one follower bearing positioned on a portion of the handle actuator so as to reduce friction between the handle actuator and the helical member. In some embodiments, the helical drive includes at least one plain bearing positioned on a portion of the frame so as to reduce friction between the helical member and the frame. In some embodiments, the helical member has a helical pitch of between 85 millimeters and 95 millimeters. In some embodiments, the helical member has a lead angle of between 24 degrees and 27 degrees. In some embodiments, the helical member has a pitch diameter of between 48 millimeters and 52 millimeters.

In some embodiments, a helical drive system includes a control system, the control system including a handle assembly that is operable to selectively position the control system in a "neutral" position, a "forward" position, or a "reverse" position. In some embodiments, the helical drive system includes a helical member having at least one helical depression formed therein. In some embodiments, the control system includes a sleeve surrounding the helical member, the sleeve having at least one internal thread engaging the at least one helical depression of the helical member. In some embodiments, the control system includes at least a first one-way bearing and a second one-way configured to selectively engage the sleeve, wherein, when the first one-way bearing is engaged to the sleeve, the first one-way bearing allows the sleeve to rotate with respect to the helical member in a first direction and prevents the sleeve from rotating with respect to the helical member in a second direction that is opposite the first direction, and wherein, when the second one-way bearing is engaged to the sleeve, the second one-way bearing allows the sleeve to rotate with respect to the helical member in the second direction and prevents the sleeve from rotating with respect to the helical member in the first direction.

[[TO BE COMPLETED ONCE CLAIMS ARE FINALIZED]]

DETAILED DESCRIPTION OF THE INVENTION

In some embodiments, a helical drive includes a helical member having a longitudinal axis, a frame containing the helical member, and a handle actuator movable along the frame in a direction parallel to the longitudinal axis of the helical member, thereby to induce the helical to rotate about its longitudinal axis.

In some embodiments, a helical drive includes a "positive" or "open" helical form to allow a rigid member to actuate the helical as the user applies a linear force along the primary axis of the drive, and a simple frame is used to provide a guide for the handle actuator, provide stability for the cylindrical elements of the drive, and housing surfaces for the plain bearings. In some embodiments, a helical drive includes a handle actuator, at least one follower bearing, a frame, an end cap, at least one plane bearing, an output shaft, and a helical member.

In some embodiments, a helical drive includes a "negative" or "solid" helical form including a helical path cut into a helical drive member. In some embodiments, a helical drive includes a surrounding cuff to support follower bearings. In some embodiments, when the handle is moved along the provided slot, the follower bearings make contact with the helical path cut into the drive member. In some embodiments, as the user actuates the handle, the force is applied to the helical path through the followers, thereby rotating the helical member and, in turn, the output shaft. In some embodiments, a simple frame is used to provide a guide for the handle, to provide stability for the cylindrical elements of the drive, and to provide housing surfaces for the plain bearings, while a secondary cuff provides support for the follower bearings.

Figure 1B:
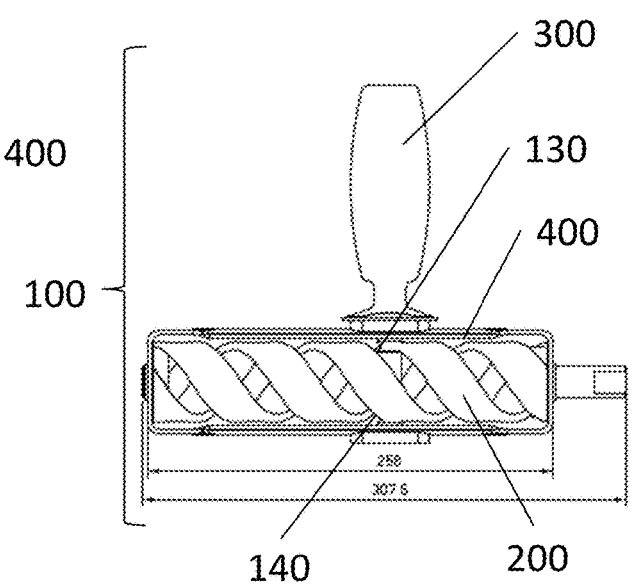
FIG. 1B shows a side view of the helical drive of FIG. 1A.
Figure 1C:
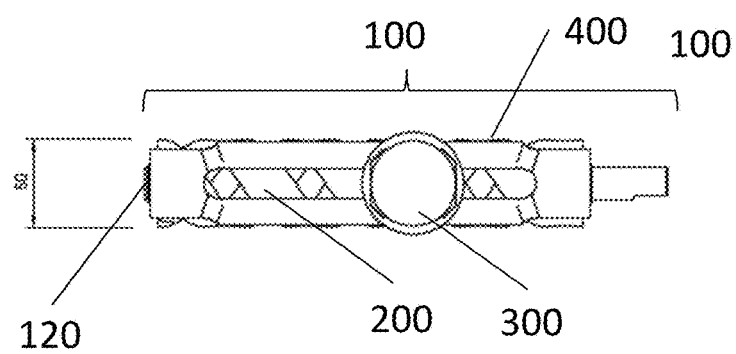
FIG. 1C shows a top view of the helical drive of FIG. 1A.
Figure 1D:
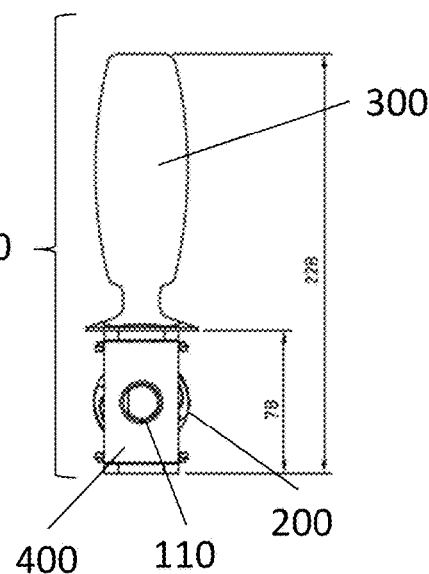
FIG. 1D shows a front view of the helical drive of FIG. 1A.

FIGS. 1A-1D show an exemplary helical drive 100 that includes a "positive" or "open" helical form from various view angles. FIG. 1A shows a perspective view, FIG. 1B shows a side view, FIG. 1C shows a top view, and FIG. 1D shows a front view.

Figure 2A:
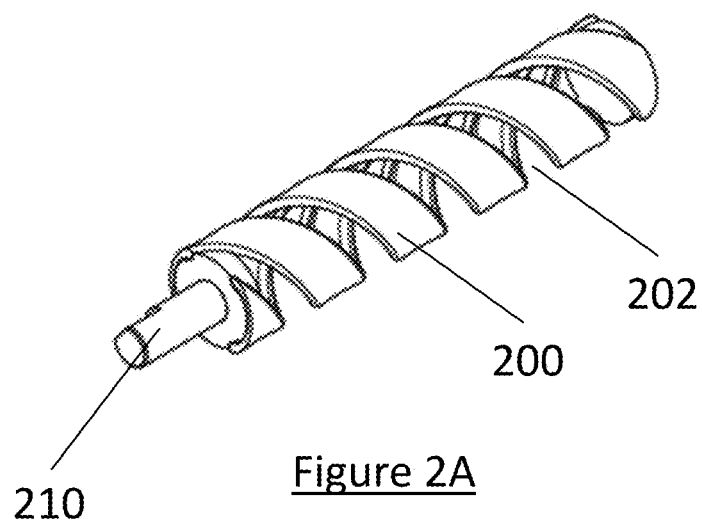
FIG. 2A shows a perspective view of a helical member of the helical drive of FIG. 1A.
Figure 2B:
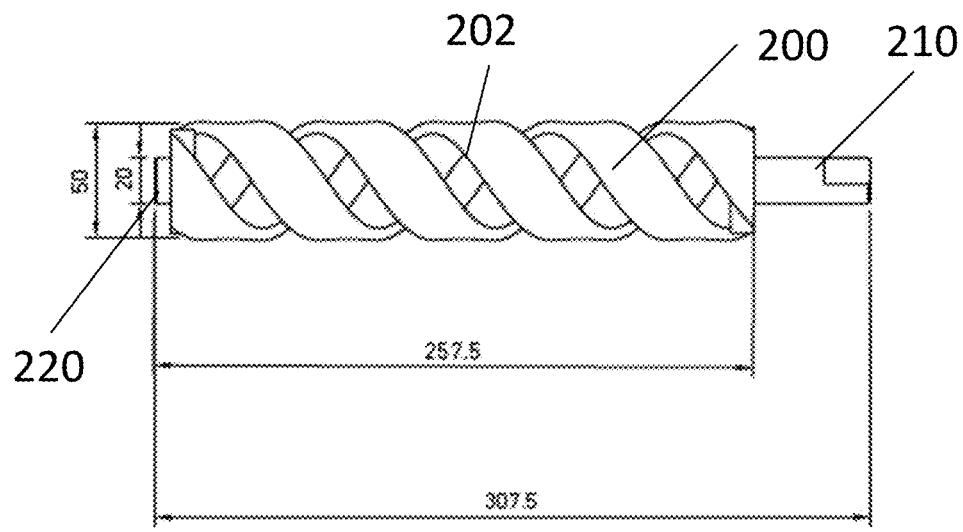
FIG. 2B shows a side view of the helical member of FIG. 2A.
Figure 2C:
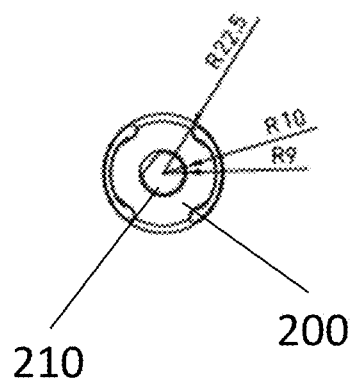
FIG. 2C shows a front view of the helical member of FIG. 2A.

FIGS. 2A-2C shows an exemplary helical member 200 of the helical drive 100 of FIGS. 1A-1D. FIG. 2A shows a perspective view, FIG. 2B shows a side view, and FIG. 2C shows a front view. The helical member 200 includes a helical channel 202 extending along and around substantially the entire length thereof. The exemplary helical member 200 is provided with a drive end cap 210 and a retention end cap 220, which are fixed to opposing ends of the helical member 200 such that an essentially inseparable whole is formed. In some embodiments, the drive end cap 210 and the retention end cap 220 are fixed to the helical member 200 by rivets. In some embodiments, the drive end cap 210 is configured to provide output torque, such as to a drive shaft. In some embodiments, the helical member 200 is made of formed stainless steel. In some embodiments, the helical member 200 is made of a chromium-nickel stainless steel alloy. In some embodiments, the helical member 200 is made of type 301 stainless steel. In some embodiments, the helical member 200 is made from a cold-rolled bead-blasted stainless steel. In some embodiments, the helical member 200 is formed using a three-axis CNC helical forming machine. In some embodiments, the helical member 200 is formed using a helix forming machine such as those commercialized by Helix Flight Manufacturing Machines of Auckland, New Zealand. In some embodiments, the helical member 200 is formed using a spring forming machine.

Figure 3C:
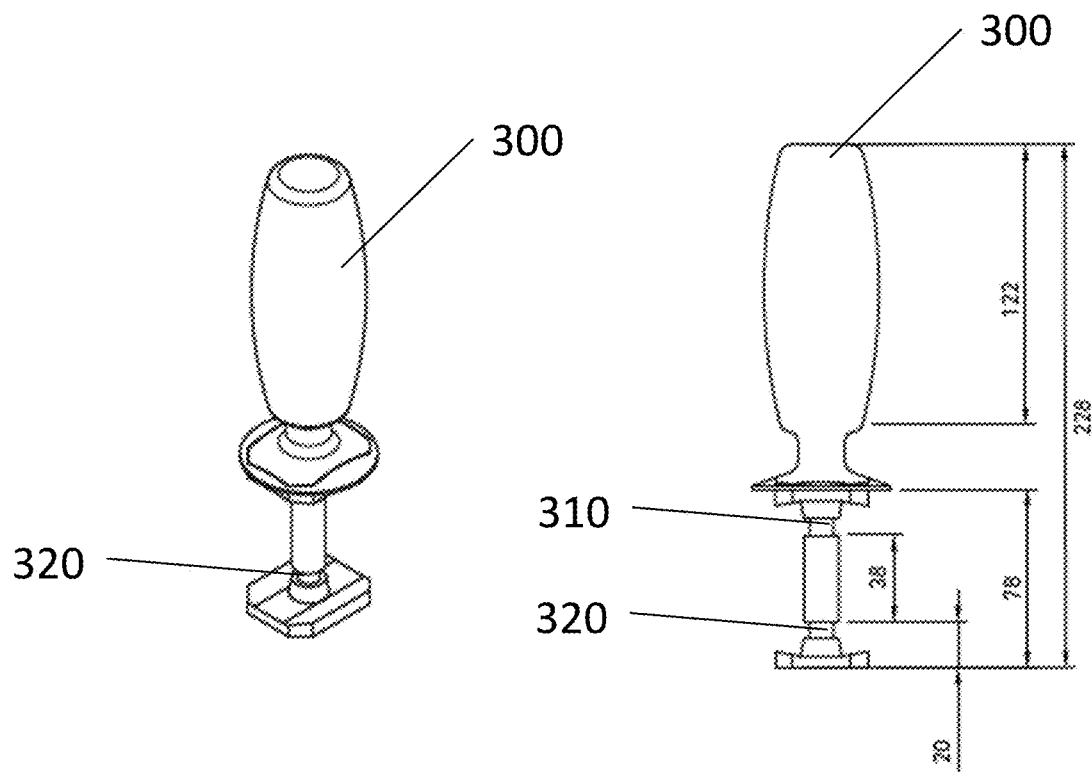
FIG. 3C shows a top view of the actuator handle of FIG. 3A.
Figure 3C:
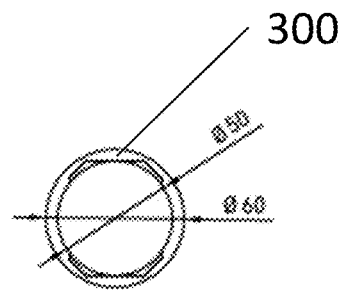

FIGS. 3A-3C show an exemplary handle actuator 300 of the helical drive 100 of FIGS. 1A-1D. FIG. 3A shows a perspective view, FIG. 3B shows a side view, and FIG. 3C shows a top view. The handle actuator 300 includes recesses 310 and 320 that are sized and shaped to receive follower bearings, which will be described in further detail hereinafter. In some embodiments, the handle actuator 300 is made from an aluminum alloy. In some embodiments, the handle actuator 300 is made by a stamping process. In some embodiments, the handle actuator 300 is made from an alloy including aluminum, magnesium, and silicon, such as 6061 aluminum.

FIGS. 4A-4D show an exemplary frame 400 of the helical drive 100 of FIGS. 1A-1D. FIG. 4A shows a perspective view, FIG. 4B shows a side view, FIG. 4C shows a top view, and FIG. 4D shows a front view. The frame 400 includes a top slot 410 and a bottom slot 420 (collectively "the slots 410, 420") that are sized and shaped to receive the handle actuator 300 therein in a manner such that the handle actuator 300 is free to move along the frame 400 along an allowable travel defined by the length of the top slot 410 and the bottom slot 420. The frame 400 includes a drive end hole 430 and a retention end hole 440, which are configured to receive the drive end cap 210 and the retention end cap 220, respectively, of the helical member 200, thereby to retain the helical member 200 within the frame 400 and to allow the helical member 200 to rotate along its longitudinal axis with respect to the frame 400. FIGS. 5A-5D show an exemplary partially assembled view of the frame 400 and the handle actuator 300. FIG. 5A shows a perspective view, FIG. 5B shows a side view, FIG. 5C shows a top view, and FIG. 5D shows a front view. In some embodiments, the frame 400 is made from an aluminum alloy. In some embodiments, the frame 400 is made by a stamping process. In some embodiments, the frame 400 is made from an alloy including aluminum, magnesium, and silicon, such as 6061 aluminum.

Referring back to FIGS. 1A-1D, the helical drive 100 includes plain bearings 110 and 120 that are positioned within the drive end hole 430 and the retention end hole 440, respectively, of the frame 400, and about the drive end cap 210 and the retention end cap 220, respectively, of the helical member 200, thereby to reduce rotational friction when the helical member 200 rotates about its longitudinal axis. The helical drive 100 also includes follower bearings 130 and 140 that are positioned within the recesses 310 and 320, respectively, of the handle actuator 300, thereby to reduce friction when the handle actuator 300 moves along the slots 410, 420 of the frame 400 to drive rotational motion of the helical member 200. In some embodiments, at least one of the plain bearings 110 and 120 is a bearing such as the bearings commercialized by Igus Inc. of East Providence, R.I. under the trade name IGLIDE. In some embodiments, at least one of the plain bearings 110, 120 and/or at least one of the follower bearings 130, 140 includes a tape liner such as the liner commercialized by Igus Inc. of East Providence, R.I. under the trade name IGLIDUR.

Figure 6A:
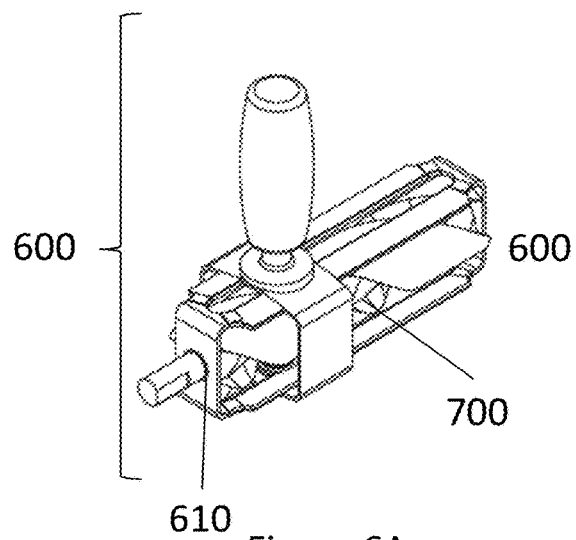
FIG. 6A shows a perspective view of a second exemplary embodiment of a helical drive.
Figure 6B:
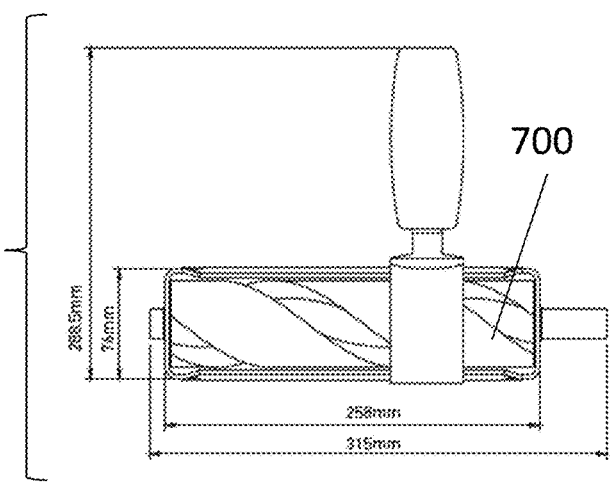
FIG. 6B shows a side view of the helical drive of FIG. 6A.
Figure 6C:
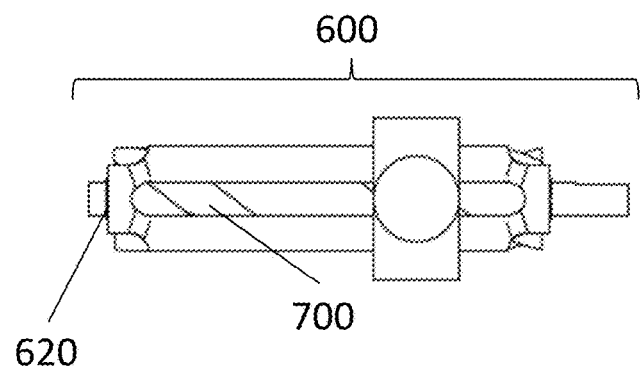
FIG. 6C shows a top view of the helical drive of FIG. 6A.
Figure 6D:
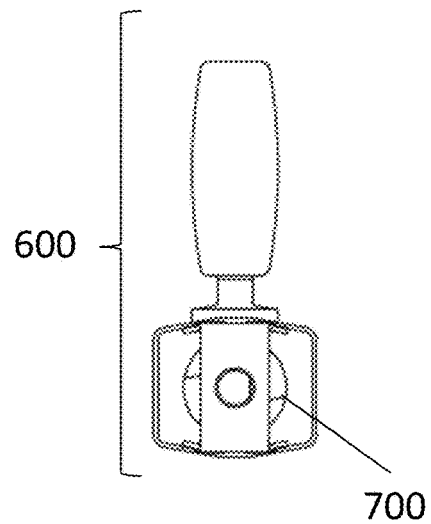
FIG. 6D shows a front view of the helical drive of FIG. 6A.

FIGS. 6A-6D show various views of an exemplary helical drive 600 that includes a "negative" or "solid" helical form. FIG. 6A shows a perspective view, FIG. 6B shows a side view, FIG. 6C shows a top view, and FIG. 6D shows a front view.

FIGS. 7A-7C shows an exemplary helical member 700 of the helical drive 600 of FIGS. 6A-6D. FIG. 7A shows a perspective view, FIG. 7B shows a side view, and FIG. 7C shows a front view. The helical member 700 includes a helical channel 702 extending along and around substantially the entire length thereof. The exemplary helical member 700 is provided with a drive end cap 710 and a retention end cap 720, which are fixed to opposing ends of the helical member 700 such that an essentially inseparable whole is formed. In some embodiments, the drive end cap 710 and the retention end cap 720 are fixed to the helical member 700 by rivets. In some embodiments, the drive end cap 710 is configured to provide output torque, such as to a drive shaft. In some embodiments, the helical member 700 is made of formed stainless steel. In some embodiments, the helical member 700 is made of a chromium-nickel stainless steel alloy. In some embodiments, the helical member 700 is made of type 301 stainless steel. In some embodiments, the helical member 700 is made from a cold-rolled bead-blasted stainless steel. In some embodiments, the helical member 700 is formed using a three-axis CNC helical forming machine. In some embodiments, the helical member 700 is formed using a helix forming machine such as those commercialized by Helix Flight Manufacturing Machines of Auckland, New Zealand. In some embodiments, the helical member 700 is formed using a spring forming machine.

FIGS. 8A-8C show an exemplary handle actuator 800 of the helical drive 600 of FIGS. 6A-6D. FIG. 8A shows a perspective view, FIG. 8B shows a side view, FIG. 8C shows a front view, and FIG. 8D shows a top view. The handle actuator 800 includes a handle portion 810, a frame portion 820, and prongs 830 and 840 extending from the frame portion 820 that are sized and shaped to receive follower bearings, which will be described in further detail hereinafter. In some embodiments, the handle actuator 800 is made from an aluminum alloy. In some embodiments, the handle actuator 800 is made by a stamping process. In some embodiments, the handle actuator 800 is made from an alloy including aluminum, magnesium, and silicon, such as 6061 aluminum.

Figure 9A:
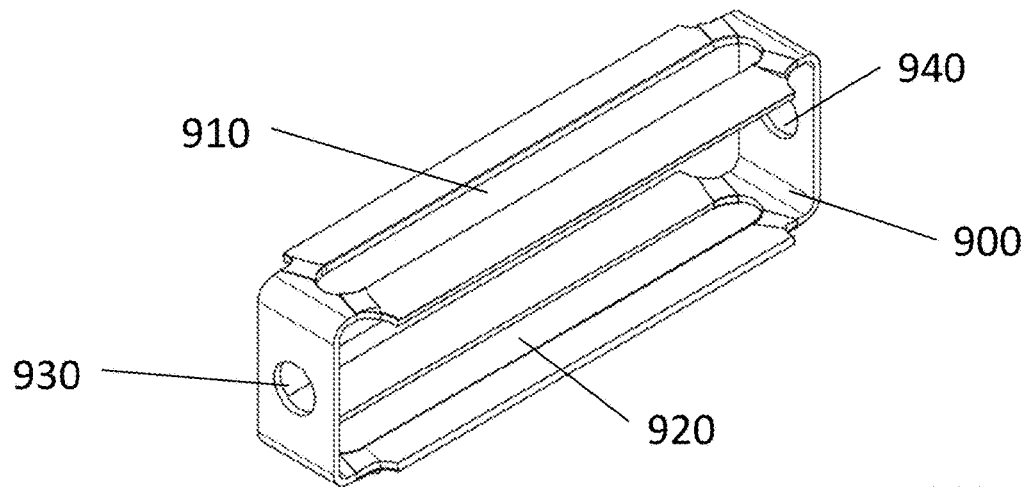
FIG. 9A shows a perspective view of a frame of the helical drive of FIG. 6A.
Figure 9B:
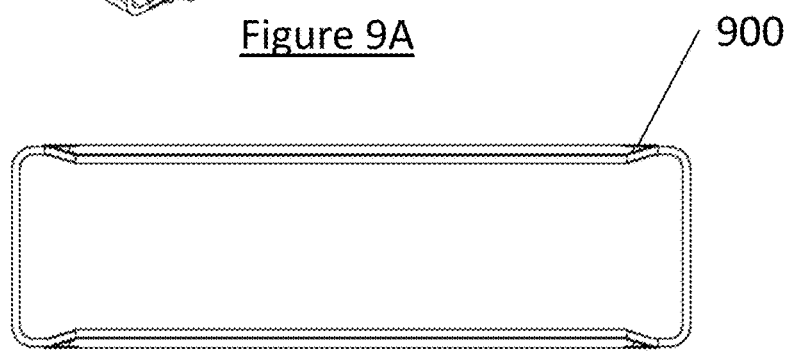
FIG. 9B shows a side view of the frame of FIG. 9A.
Figure 9C:
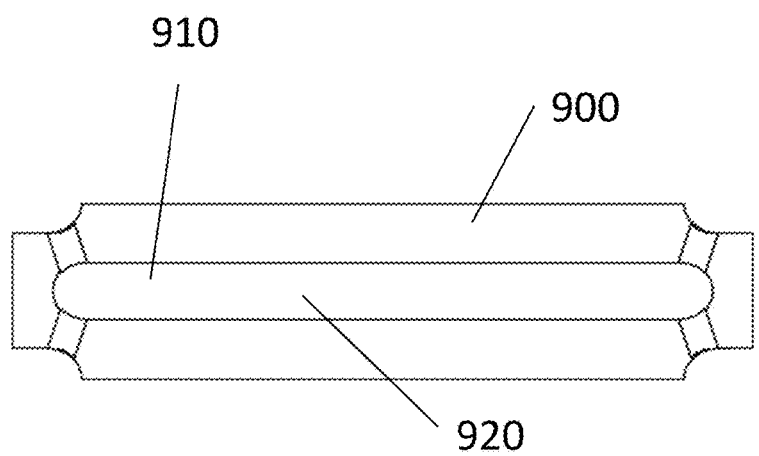
FIG. 9C shows a top view of the frame of FIG. 9A.
Figure 9D:
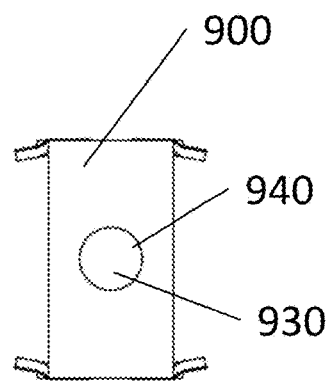
FIG. 9D shows a front view of the frame of FIG. 9A.
Figures 10A, 10B:
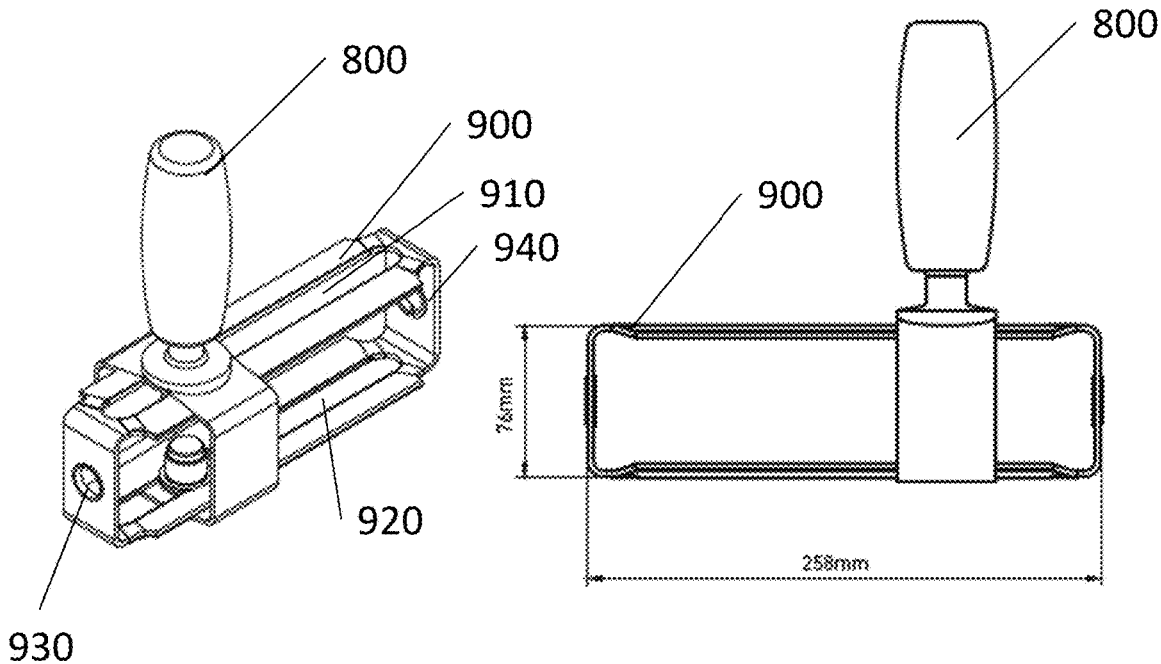
FIG. 10A shows a perspective view of a subassembly including the actuator handle of FIG. 8A and the frame of FIG. 9A.
FIG. 10B shows a side view of the subassembly of FIG. 10A.
Figures 10C, 10D:
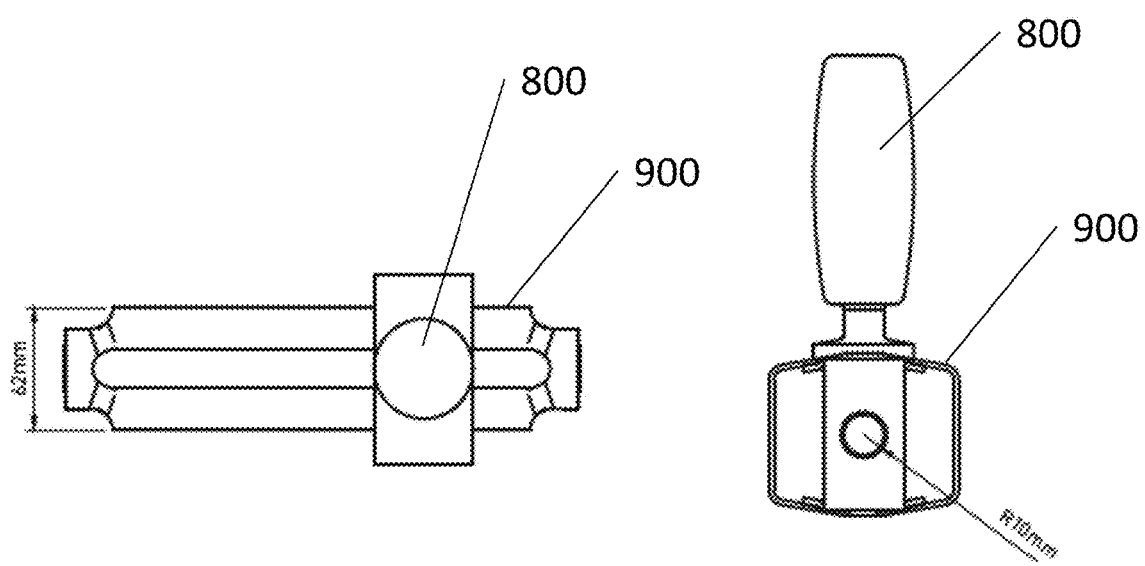
FIG. 10C shows a top view of the subassembly of FIG. 10A.
FIG. 10D shows a front view of the subassembly of FIG. 10A.

FIGS. 9A-9D show an exemplary frame 900 of the helical drive 600 of FIGS. 6A-6D. FIG. 9A shows a perspective view, FIG. 9B shows a side view, FIG. 9C shows a top view, and FIG. 9D shows a front view. The frame 400 is sized and shaped to be received within the frame portion 820 of the handle actuator 800 (see, e.g., FIG. 10A) such that the handle actuator 800 can move along the frame 800. The frame 800 includes a top slot 810 and a bottom slot 820 (collectively "the slots 810, 820") that are sized and shaped to receive the prongs 830 and 840 of the handle actuator 800 therein in a manner such that the handle actuator 800 is free to move along the frame 900 along an allowable travel defined by the length of the top slot 910 and the bottom slot 920. The frame 900 includes a drive end hole 930 and a retention end hole 940, which are configured to receive the drive end cap 710 and the retention end cap 720, respectively, of the helical member 700, thereby to retain the helical member 700 within the frame 900 and to allow the helical member 700 to rotate along its longitudinal axis with respect to the frame 900. FIGS. 10A-10D show an exemplary partially assembled view of the frame 900 and the handle actuator 800. FIG. 10A shows a perspective view, FIG. 10B shows a side view, FIG. 10C shows a top view, and FIG. 10D shows a front view. In some embodiments, the frame 900 is made from an aluminum alloy. In some embodiments, the frame 900 is made by a stamping process. In some embodiments, the frame 900 is made from an alloy including aluminum, magnesium, and silicon, such as 6061 aluminum.

Referring back to FIGS. 6A-6D, the helical drive 600 includes plain bearings 610 and 620 that are positioned within the drive end hole 930 and the retention end hole 940, respectively, of the frame 900, and about the drive end cap 710 and the retention end cap 720, respectively, of the helical member 700, thereby to reduce rotational friction when the helical member 700 rotates about its longitudinal axis. The helical drive 600 also includes follower bearings 630 and 640 (see FIG. 21) that are positioned over the prongs 830 and 840, respectively, of the handle actuator 800, thereby to reduce friction when the handle actuator 800 moves along the slots 910, 920 of the frame 900 to drive rotational motion of the helical member 700. In some embodiments, at least one of the plain bearings 610 and 620 is a bearing such as the bearings commercialized by Igus Inc. of East Providence, R.I. under the trade name IGLIDE. In some embodiments, at least one of the plain bearings 610, 620 and/or at least one of the follower bearings 630, 640 includes a tape liner such as the liner commercialized by Igus Inc. of East Providence, R.I. under the trade name IGLIDUR.

Figure 11:
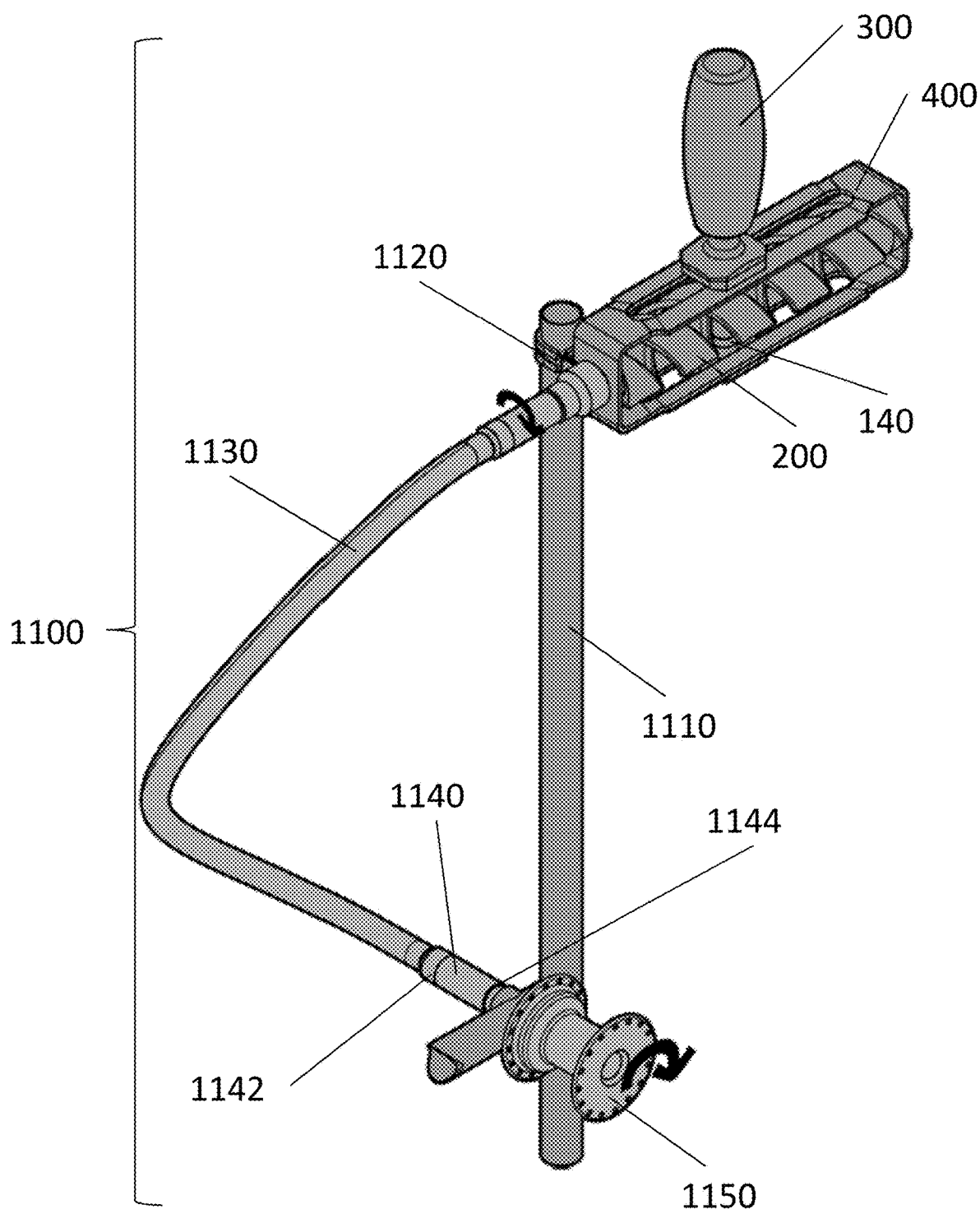
FIG. 11 shows a perspective view of a helical drive system including the helical drive of FIG. 1A.

FIG. 11 shows a perspective view of a helical drive system 1100. In some embodiments, such as the embodiment shown in FIG. 11, the helical drive system 1100 includes the helical drive 100 described above with reference to FIGS. 1A-5D. However, it will be apparent to those of skill in the art that in other embodiments, the helical drive system 1100 may include a different helical drive such as the helical drive 600 described above with reference to FIGS. 6A-10D. In the helical drive system 1100, the helical drive 100 is secured to a structural element 1110 (e.g., a structural member of a vehicle that is to be driven by the helical drive 100). In some embodiments, the helical drive 100 is secured to the structural element 1110 by a clamp 1120. However, it will be apparent to those of skill in the art that the helical drive 100 may be secured to the structural element 1110 by any other suitable fastening mechanism known in the art. It will also be apparent to those of skill in the art that the helical drive 100 need not be secured to the structural element 1110 by the clamp 1120 or other fastening mechanism located at the specific location of the frame 400 shown in FIG. 11, and may be secured to the structural element 1110 at any other position along the frame 400 of the helical drive 100.

Continuing to refer to FIG. 11, the helical drive system 1100 also includes a flexible output shaft 1130 having a first end 1132 and a second end 1134 opposite the first end 1132. In some embodiments, the flexible shaft 1130 is a flexible shaft that is capable of transmitting rotary motions/torques while bent around a desired path. In some embodiments, the flexible shaft 1130 is capable of rotation at speeds of up to 10,000 rpm. In some embodiments, the flexible shaft 1130 has a circular cross-section. In some embodiments, the flexible shaft 1130 has a diameter of 0.25 inches. In some embodiments, the flexible shaft 1130 is capable of transmitting an applied torque of up to 110 inch-pounds. In some embodiments, the flexible shaft 1130 is made from a steel alloy. In some embodiments, the flexible shaft 1130 is capable of performing as described above while flexed to a bend radius of 5 inches or more. In some embodiments, the flexible shaft 1130 is similar to the flexible shafts commercialized the McMaster-Carr Supply Company of Elmhurst, Ill. as part number 3787. In some embodiments, the first end 1132 of the flexible shaft 1130 is secured to the drive end cap 210 of the helical member 200 of the helical drive 100 by a set screw connection, thereby to transmit torque from the helical member 200 to the first end 1132 of the flexible shaft 1130 and along the flexible shaft 1130 to the second end 1134 thereof.

Continuing to refer to FIG. 11, the helical drive system 1100 includes a freewheel 1140. As will be known to those of skill in the art, a freewheel is a transmission device that disengages a driveshaft (e.g., the flexible shaft 1130) from a driven shaft (e.g., a downstream component of a drive train that is driven by the driveshaft) when the driven shaft rotates faster than the driveshaft. In some embodiments, such disengagement occurs, for example, when the driven shaft is rotating in a first direction (e.g., a direction that propels a vehicle in a primary travel direction) and the driveshaft is rotated in a second direction opposite the first direction. In some embodiments, the freewheel 1140 is similar to the freewheel commercialized by Shimano, Inc. of Sakai, Japan under the trade name RM33. The freewheel 1140 includes a first side 1142 that is coupled to the flexible shaft 1130 and a second side 1144 opposite the first side 1142.

Continuing to refer to FIG. 11, the helical drive system 1100 includes a hub 1150. In some embodiments, the hub 1150 is the hub of a wheel to be driven by the helical drive system 1100, thereby to drive a vehicle. In some embodiments, the hub 1150 drives a vehicle or other device to be driven by the helical drive system in a manner commensurate with the operation of the vehicle or other device. The hub 1150 is coupled to the second side 1144 of the freewheel 1140.

Figure 12:
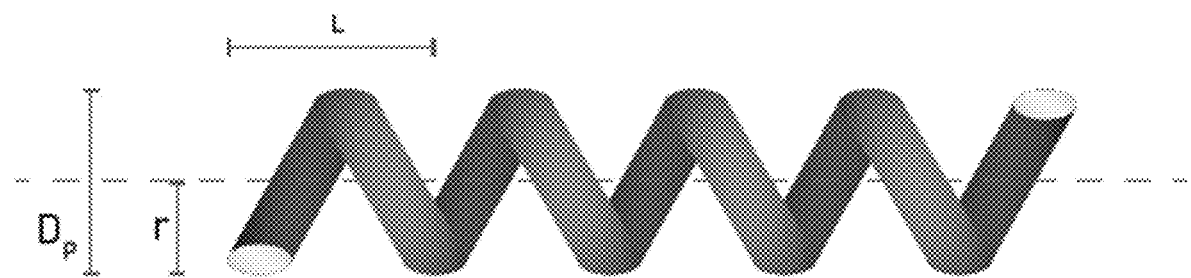
FIG. 12 shows a side view of a representative helical section.
Figure 13:
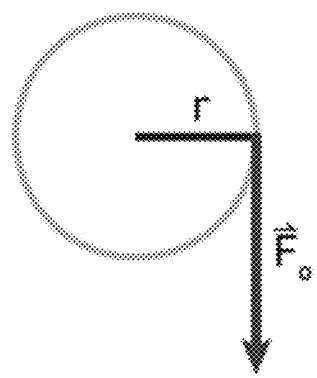
FIG. 13 shows a cross-sectional view of a representative helical section.

In some embodiments, the torque generated by the helical drive 100 or 600 results from the application of a force at a distance from the center of the drive shaft. In some embodiments, the torque is the product of the orthogonal applied force and the distance from the center of the shaft. FIG. 12 shows a side view of a representative helical section, wherein r represents the radius, $D_p$ represents the pitch diameter, and L represents the lead. FIG. 13 shows a cross-section of a helical section to illustrate torque, wherein $F_o$ represents the orthogonal force and r represents the radius.

In some embodiments, the orthogonal component of the force can be understood by "unravelling" one pitch (e.g., rotation) of the helical path into an incline plane relationship. In some embodiments, the follower bearing can be understood to be working against the plane to develop the orthogonal force $F_o$. In some embodiments, a number of other forces arrive, including the frictional force $F_F$. In some embodiments, the forces also include the normal force $F_N$, the vertical component of which will act as "thrust" along the axis of the bearing and may be considered when selecting the bearings. FIG. 1400 relationship of these forces based on the selected helical angle $\lambda$. The following equations may then be considered in designing the helical drive 100 or 600:

$$T = F \cdot d \quad (1)$$

$$T = \frac{\vec{F} D_p}{2} \left[ \frac{L + \pi f D_p}{\pi D_p - fL} \right] \quad (2)$$

$$T = \frac{\vec{F} D_p}{2} [\sin(\lambda) - f \cdot \cos(\lambda)] \quad (3)$$

$$e = \frac{FL}{2\pi T} \quad (4)$$

In the above, Equation (1) is the standard definition of torque, and is used to translate the orthogonal force into torque delivered at the shaft output. Equation (3) translates the applied downward force Fa into the component Fo and further into the applied torque about the central axis of the drive via Equation (1), where r is half of the pitch diameter. Efficiency of the drive output, which can be understood to equal the ratio of actual torque output with frictional losses to ideal torque output without frictional losses, is calculated via Equation (4) above.

Figure 14:
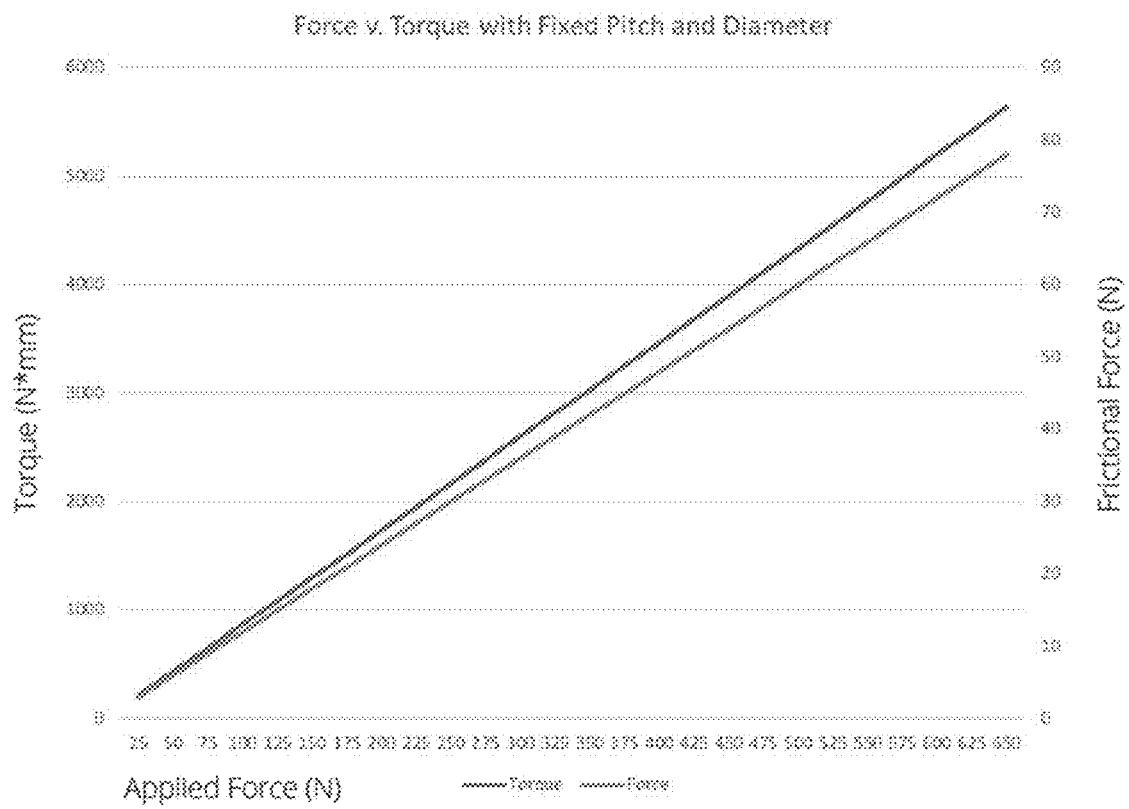
FIG. 14 shows a graph of torque and frictional force against applied force for a helical drive.

FIG. 14 shows graphs of torque and frictional force against applied force for a helical drive including a 50 mm pitch diameter and a helical pitch of 80 mm (which correspond to a lead angle of 27 degrees). It may be seen that there is a linear relationship between torque and applied force, and that increased force results in increased torque with no particular local maxima. It may also be seen that there is a linear relationship between frictional force and applied force.

Figure 15:
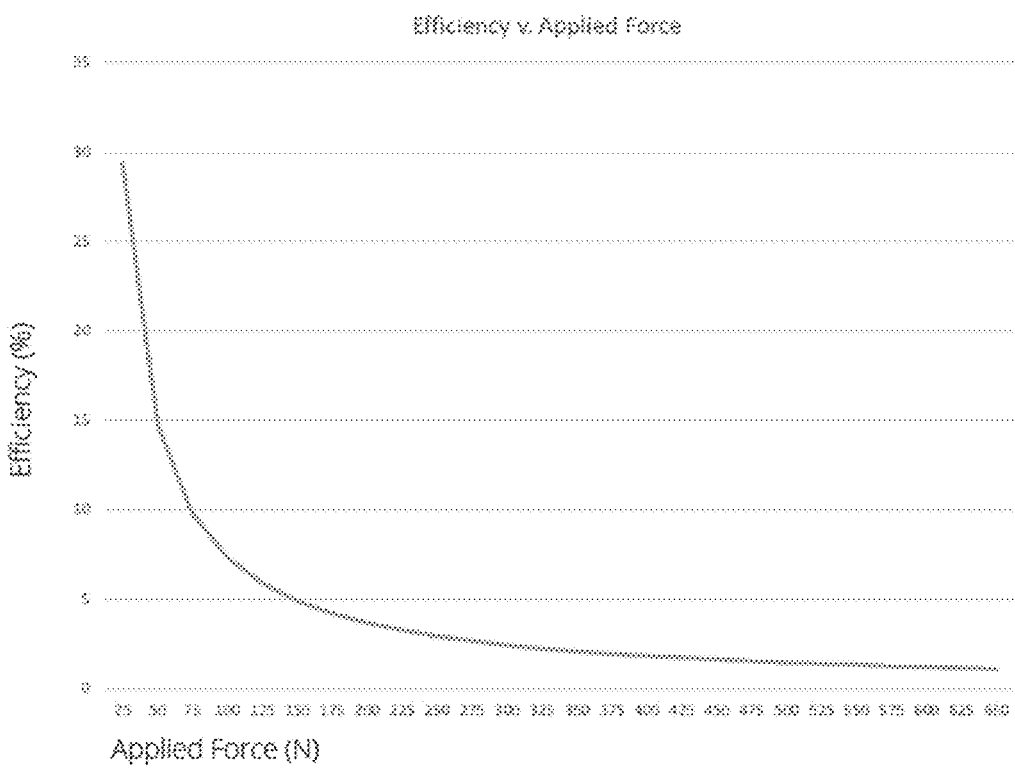
FIG. 15 shows a graph of efficiency against applied force for a helical drive.

FIG. 15 shows a graph of efficiency against applied force for a helical drive having dimensions as noted above. It may be seen that there is a precipitous drop in efficiency between 0 and 200 N and a gradual decline thereafter. In some embodiments, this may suggest that greater efficiency is achieved with applied forces below the average possible from a given user.

Figure 16:
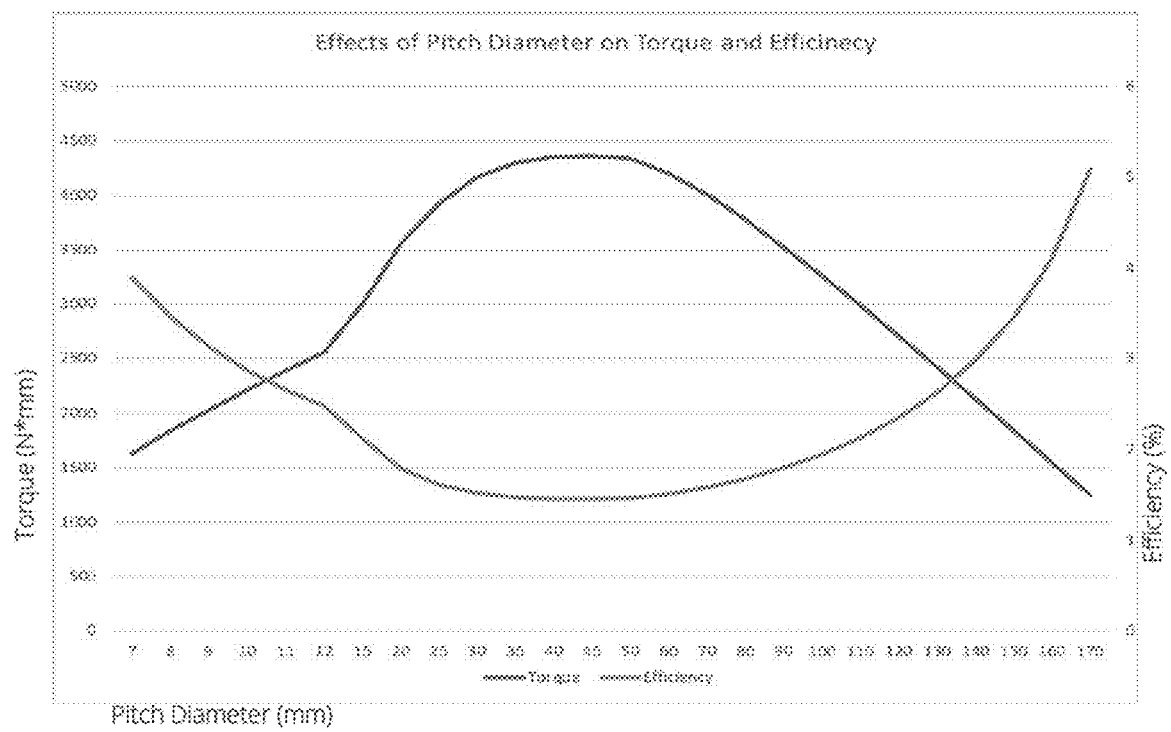
FIG. 16 shows graphs of torque and efficiency against pitch diameter for a helical drive.

FIG. 16 shows graphs of torque and efficiency for varying values of pitch diameter with a constant helical pitch of 80 mm and a nominal applied force of 50 N. It may be seen that there is a local maximum for torque for pitch diameter in the range of 40 mm to 50 mm, and that there is a local minimum of efficiency in the same range. It may be inferred from FIG. 16 that pitch diameter should be set between 40 mm and 80 mm, with lower values producing greater torque at lower efficiency, and higher values providing higher efficiency but lower torque production overall. In some embodiments, a pitch diameter in the range of 50 mm to 60 mm provides a desirable compromise between torque and efficiency.

Figure 17:
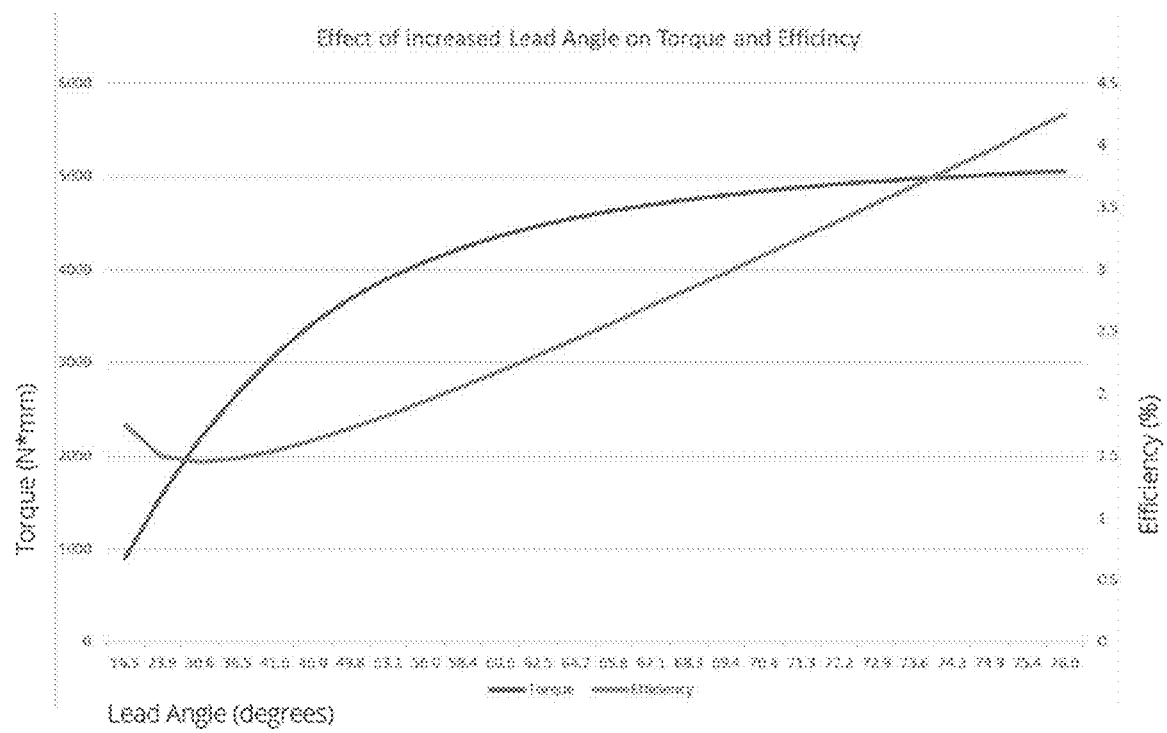
FIG. 17 shows graphs of torque and efficiency against lead angle for a helical drive.

FIG. 17 shows graphs of torque and efficiency against lead angle with a constant pitch diameter of 50 mm and a nominal applied force of 500 N. It may be seen that a local minimum for efficiency occurs with a 30 degree pitch angle (which corresponds to a helical pitch of 40 mm), increasing thereafter. It may also be seen that torque appears to increase logarithmically with respect to lead angle, with the most dramatic increases occurring over lower lead angles, and that most of the appreciable gains have been realized once the lead angle reaches 56 degrees (which corresponds to a helical pitch of 100 mm). In some embodiments, a helical pitch of 80 mm to 100 mm provides a desirable compromise between efficiency, torque, and stroke length. In some embodiments, a shorter helical pitch may be desirable because helical pitch determines the number of rotations generated per linear stroke by the user, with more rotations per linear stroke when helical pitch is shorter.

Based on the graphs discussed above, certain conclusions may be drawn. It may be concluded that the relationship between torque output, frictional losses and force input are linear regardless of other dimensions or parameters. It may further be concluded that, in some embodiments, there is an advantage to increasing lead angle in order to improve torque output at the sacrifice of efficiency, although efficiency varies slightly when compared with the relative gains in torque output. It may be further be concluded that the peak in torque output when evaluating different pitch diameters is tied directly to the selected, and larger lead angles reward (i.e., provide improved torque output in connection with larger pitch diameters). Accordingly, it may be concluded that, in some embodiments, it is advantageous to have both a large pitch diameter and a large lead angle. It may further be concluded that advantageous performance may be realized with a helical drive having a helical pitch of 90 millimeters (yielding an approximate lead angle of 25.5 degrees) and a pitch diameter of 50 millimeters in order to realize the dual goals of optimizing torque and efficiency while trying to maintain a compact drive (e.g., a drive that is appropriately sized for use in human-powered vehicles and other similarly-sized devices).

In some embodiments, a helical member has a helical pitch of between 70 mm and 110 mm. In some embodiments, a helical member has a helical pitch of between 75 mm and 105 mm. In some embodiments, a helical member has a helical pitch of between 80 mm and 100 mm. In some embodiments, a helical member has a helical pitch of between 85 mm and 95 mm. In some embodiments, a helical member has a helical pitch of about 90 mm. In some embodiments, a helical member has a helical pitch of 90 mm.

In some embodiments, a helical member has a pitch diameter of between 40 mm and 60 mm. In some embodiments, a helical member has a pitch diameter of between 42.5 mm and 57.5 mm. In some embodiments, a helical member has a pitch diameter of between 45 mm and 55 mm.

In some embodiments, a helical member has a pitch diameter of between 47.5 mm and 52.5 mm. In some embodiments, a helical member has a pitch diameter of about 50 mm. In some embodiments, a helical member has a pitch diameter of 50 mm.

In some embodiments, a helical member has a lead angle of between 20 degrees and 30 degrees. In some embodiments, a helical member has a lead angle of between 22 degrees and 28 degrees. In some embodiments, a helical member has a lead angle of between 24 degrees and 26 degrees. In some embodiments, a helical member has a lead angle of between 25 degrees and 26 degrees. In some embodiments, a helical member has a lead angle of between 24 degrees and 27 degrees. In some embodiments, a helical member has a lead angle of about 25.5 degrees. In some embodiments, a helical member has a lead angle of 25.5 degrees.

Figure 18:
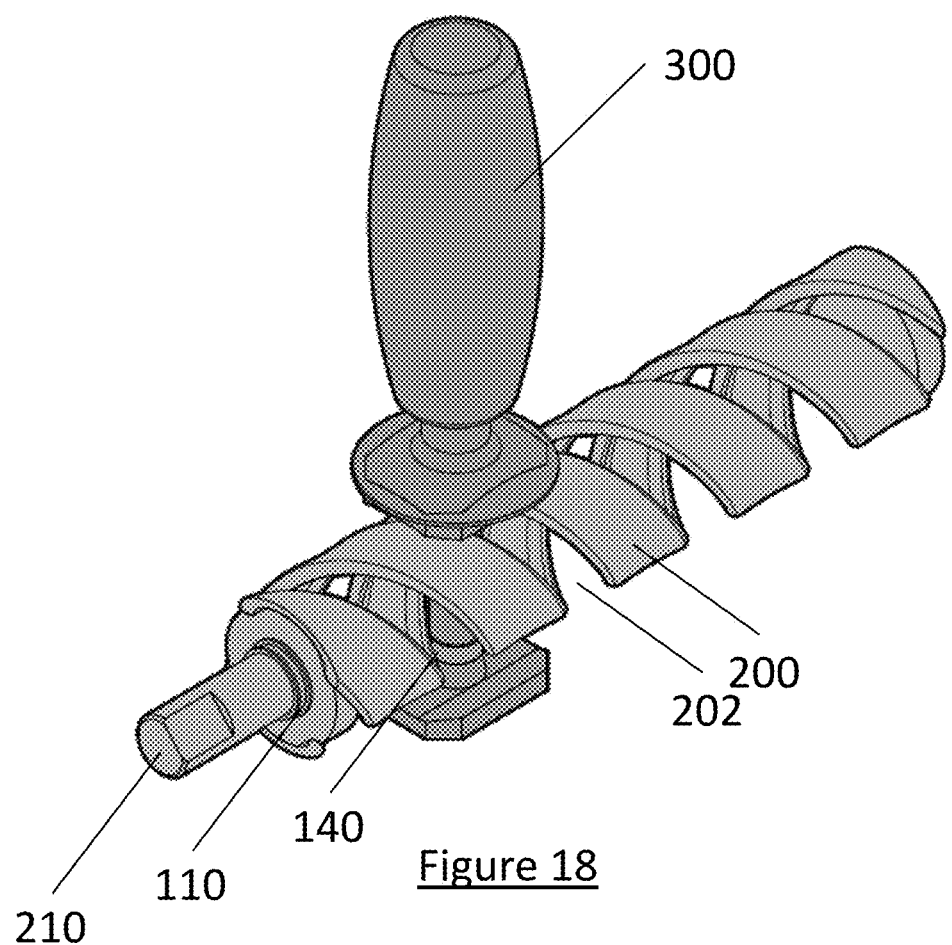
FIG. 18 shows a first subset of selected elements of a helical drive system including the helical drive of FIG. 1A.
Figure 19:
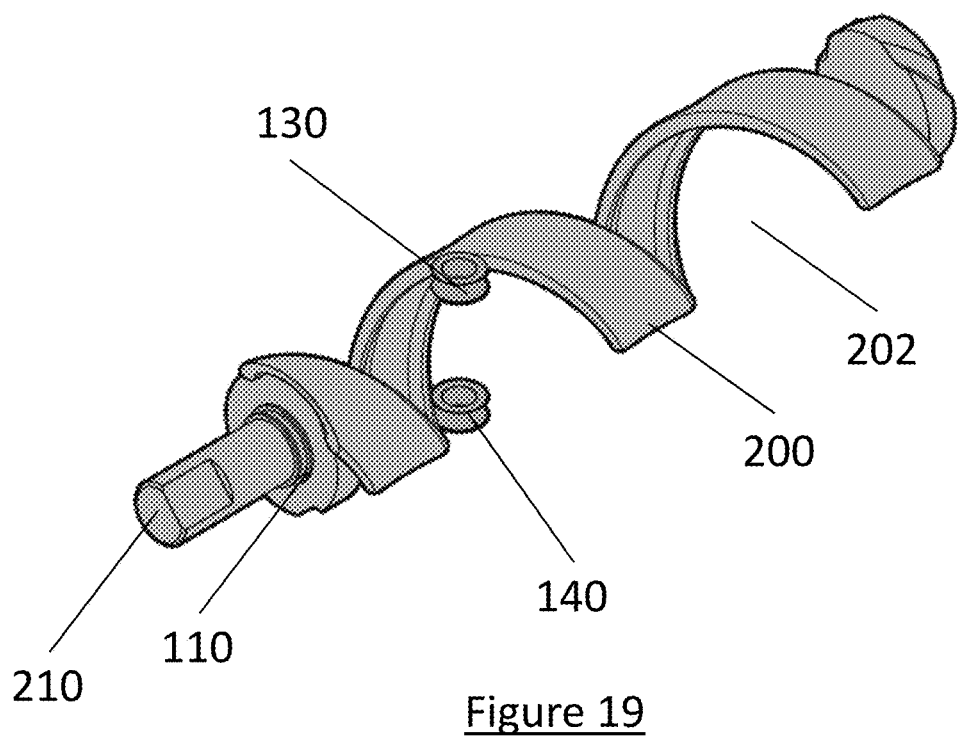
FIG. 19 shows a second subset of selected elements of a helical drive system including the helical drive of FIG. 1A.
Figure 20:
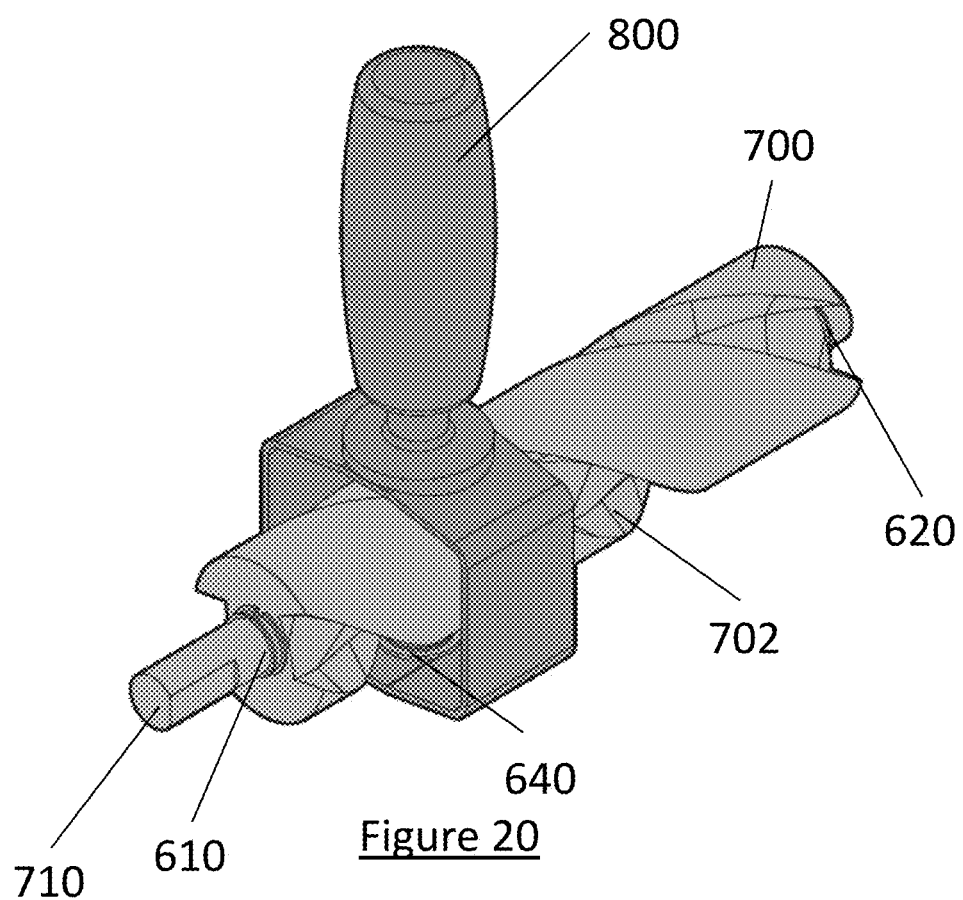
FIG. 20 shows a first subset of selected elements of a helical drive system including the helical drive of FIG. 6A.
Figure 21:
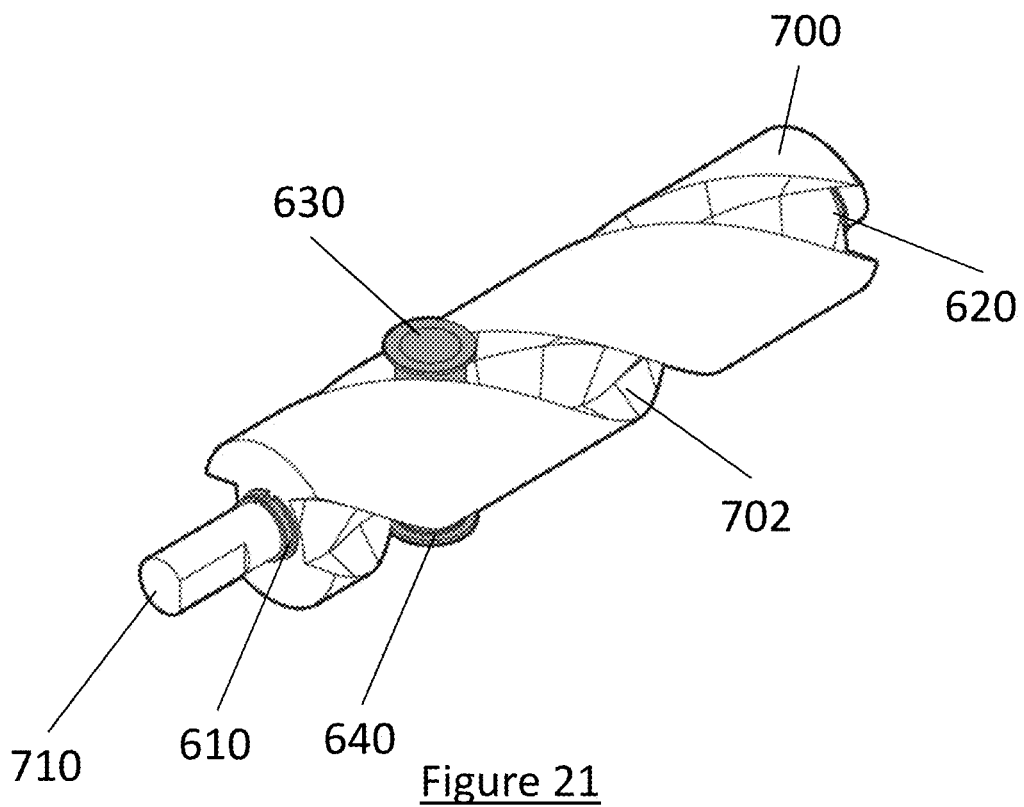
FIG. 21 shows a second subset of selected elements of a helical drive system including the helical drive of FIG. 6A.

Referring back to FIG. 11, use of the helical drive system 1100 will be described herein with specific reference to the helical drive system 1100 including the helical drive 100, but it will be apparent to those of skill in the art that use of the helical drive system 1100 including the helical drive 600 will be substantially similar. When the helical drive system 1100 is in use, the user moves the handle actuator 300 repeatedly back and forth along the slots 410, 420 between a first end of the frame 400 (e.g., the end of the frame 400 that includes the drive end hole 430) and a second end of the frame 400 (e.g., the end of the frame 400 that includes the retention end hole 440). Reciprocal motion of the handle actuator 300 in this manner forces follower bearings 130, 140 along the helical channel 202 of the helical member 200, thereby inducing rotation of the helical member 200 along its longitudinal axis corresponding to the motion of the handle actuator 300 along the slots 410, 420. FIG. 18 shows the helical member 200, the handle actuator 300, and the follower bearings 130, 140 with the remaining elements of the helical drive system 1100 removed. FIG. 19 shows the helical member 200 and the follower bearings 130, 140 with the remaining elements of the helical drive system 1100 removed. FIGS. 20 and 21 show corresponding views of portions of the helical drive system 1100 that includes the helical drive 600. These figures are illustrative to show the manner in which linear motion of the handle actuator 300 to force the follower bearings 130, 140 against the helical member causes rotational motion of the helical member 200. Rotation of the helical member 200 along its longitudinal axis causes corresponding rotation of the flexible shaft 1130 and application of torque to the first side 1142 of the freewheel 1140.

When the handle actuator 300 moves along the slots 410, 420 in a first or "drive" direction (e.g., away from the drive end hole 430 and toward the retention end hole 440, though it will be apparent to those of skill in the art that the "drive" direction may be in the opposite direction), the helical member 200 rotates about its longitudinal axis in a first or "drive" direction (e.g., clockwise, though it will be apparent to those of skill in the art that the "drive" direction may instead be counterclockwise), causing the flexible shaft 1130 and the first side 1142 of the freewheel 1140 to rotate in the "drive" direction. Such rotation results in torque being transmitted by the freewheel 1140 to the second side 1144 thereof, applying a torque and causing rotation of the hub 1150 in the "drive" direction.

Conversely, when the handle actuator 300 moves along the slots 410, 420 in a second or "free" direction (e.g., away from the retention end hole 440 and toward the drive end hole 430, though it will be apparent to those of skill in the art that the "free" direction may be in the opposite direction), the helical member 200 rotates about its longitudinal axis in a second or "free" direction that is opposite the "drive" direction (e.g., counterclockwise, though it will be apparent to those of skill in the art that the "free" direction may instead be clockwise), causing the flexible shaft 1130 and the first side 1142 of the freewheel 1140 to rotate in the "free" direction. However, rotation of the first side 1142 of the freewheel 1140 in the "free" direction causes the freewheel 1140 to disengage from applying a torque to the second side 1144 thereof, allowing the second side 1144 and the hub 1150 to continue to move in the "drive" direction. Thus, while the handle actuator 300 is moved back and forth along the slots 410, 420 in opposite directions, the hub 1150 is driven only in one direction.

In some embodiments, a drive mechanism including a helical drive also includes a control mechanism that is operable to selectively allow the helical drive to be driven only in one direction (e.g., to allow an actuator to generate torque when moved in a first direction while moving freely without generating torque when moved in an opposing second direction). In some embodiments, such a control mechanism is incorporated into a system using a negative helical form such as that shown in FIGS. 6A-6D. FIGS. 22-38 show a helical drive system 2200 including an exemplary control mechanism 2300. The helical drive system 2200 has a longitudinal axis 2205. The helical drive system 2200 includes a helical member 3100, a first end housing 3200, an end bearing 3300, a second end housing 3400, and a bevel gear 3500.

Figure 23:
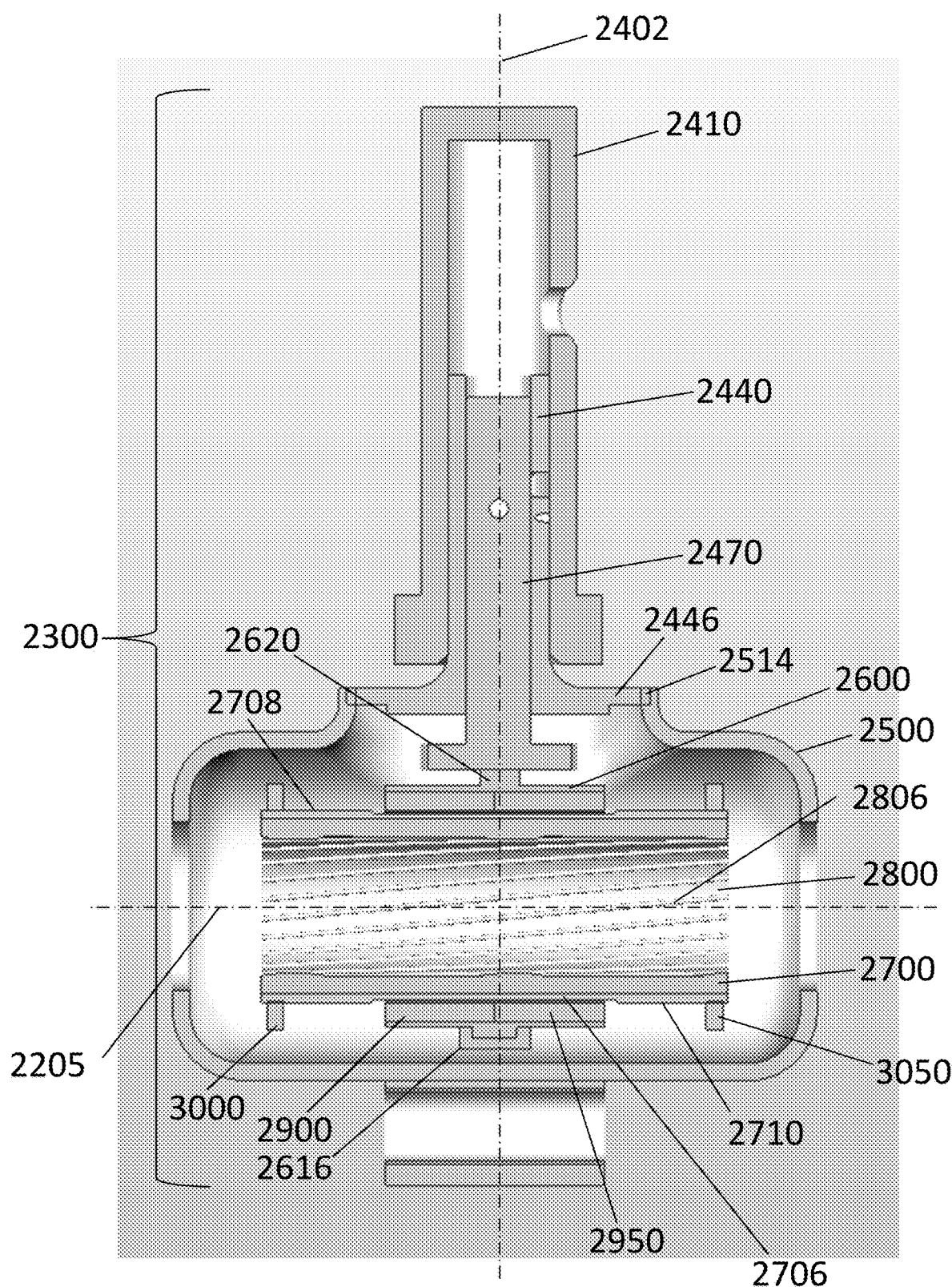
FIG. 23 shows a section view of a control system of the helical drive of FIG. 22.

Referring to FIG. 23, a section view of the control mechanism 2300 is shown. The control mechanism 2300 includes a handle assembly 2400, a housing 2500, a bearing housing 2600, a bearing control sleeve 2700, a helical sleeve 2800, bearings 2900 and 2950, and spacers 3000 and 3050.

Figure 24:
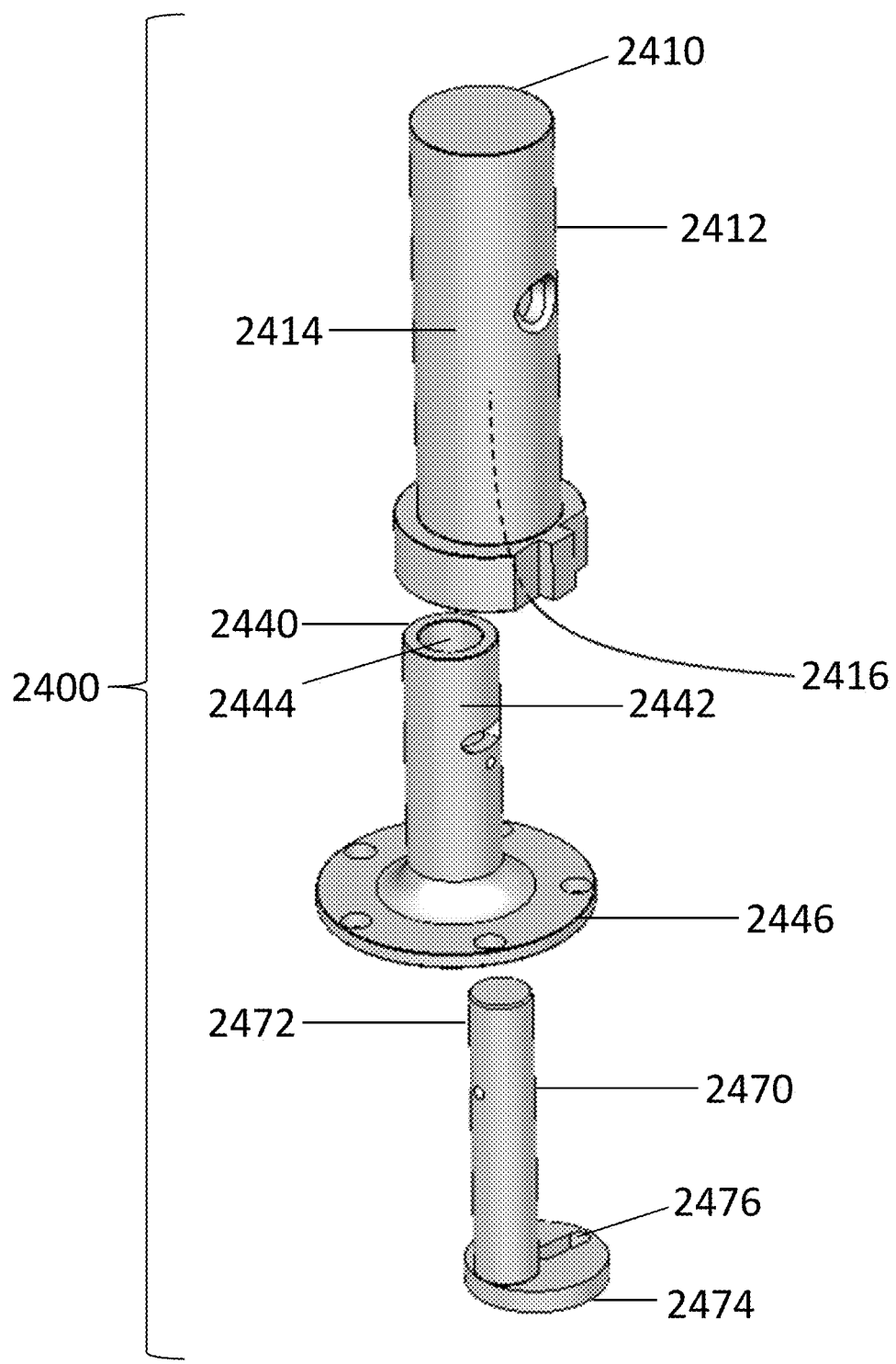
FIG. 24 shows an exploded view of a handle assembly of the helical drive of FIG. 22.

Referring now to FIG. 24, an exploded view of the handle assembly 2400 is shown. The handle assembly 2400, when assembled, defines a handle axis 2402 (see FIG. 23). In some embodiments, the handle assembly 2400 includes an outer handle 2410, an inner handle 2440, and a cam mover 2470. In some embodiments, the outer handle 2410 includes a generally cylindrical handle portion 2412 defining an outer gripping surface 2414 and a bore 2416 sized and shaped to receive the inner handle 2440. In some embodiments, the outer handle 2410 incorporates other control elements (e.g., a brake control) therein. In some embodiments, the inner handle 2440 includes a generally cylindrical handle portion 2442 sized and shaped to be received within the bore 2416 of the outer handle 2410, a mounting portion 2444, and a bore 2446 sized and shaped to receive the cam mover 2470. In some embodiments, the mounting portion 2444 includes holes 2448 that are sized and shaped to receive bolts to mount and secure the inner handle 2440 to the housing 2500. In some embodiments, a slot 2450 extends through the handle portion 2442 of the inner handle 2440. the cam mover 2470 includes a generally cylindrical handle portion 2472 configured to be received within the bore 2446 of the inner handle 2440, a generally disc-shaped cam interface portion 2474 positioned at an end of the handle portion 2472 so as to project beyond the bore 2446 of the inner handle 2440, and a cam slot 2476 extending through the cam interface portion 2474. In some embodiments, the outer handle 2410 is attached to the cam mover 2470 by a screw that is secured to the handle portion 2412 of the outer handle 2410, passes through the slot 2450 of the inner handle 2410, and is secured to the handle portion 2472 of the cam mover 2470. As a result of such attachment of the outer handle 2410 to the cam mover 2470, when a user grips the gripping surface 2414 of the outer handle 2410 and rotates the outer handle 2410 about the handle axis 2402, the cam mover 2470 will rotate identically about the handle axis 2402, while the inner handle 2440 will remain stationary. In some embodiments, rather than including a three-piece handle assembly 2400 as described above, the helical drive system 2200 includes the handle assembly 2400 having fewer or more pieces, or includes a single-piece handle operable in a similar manner to the handle assembly 2400 described herein.

In some embodiments, the outer handle 2410 comprises a metal. In some embodiments, the metal is an alloy. In some embodiments, the alloy is an aluminum or steel alloy. In some embodiments, the aluminum alloy is an aluminum alloy including silicon and magnesium. In some embodiments, the aluminum alloy is a 6000-series aluminum alloy. In some embodiments, the aluminum alloy is 6061 aluminum. In some embodiments, the inner handle 2440 comprises a metal. In some embodiments, the metal is one of the metals referenced above with respect to the outer handle 2410. In some embodiments, the cam mover 2470 comprises a metal. In some embodiments, the metal is one of the metals referenced above with respect to the outer handle 2410.

Figure 25A:
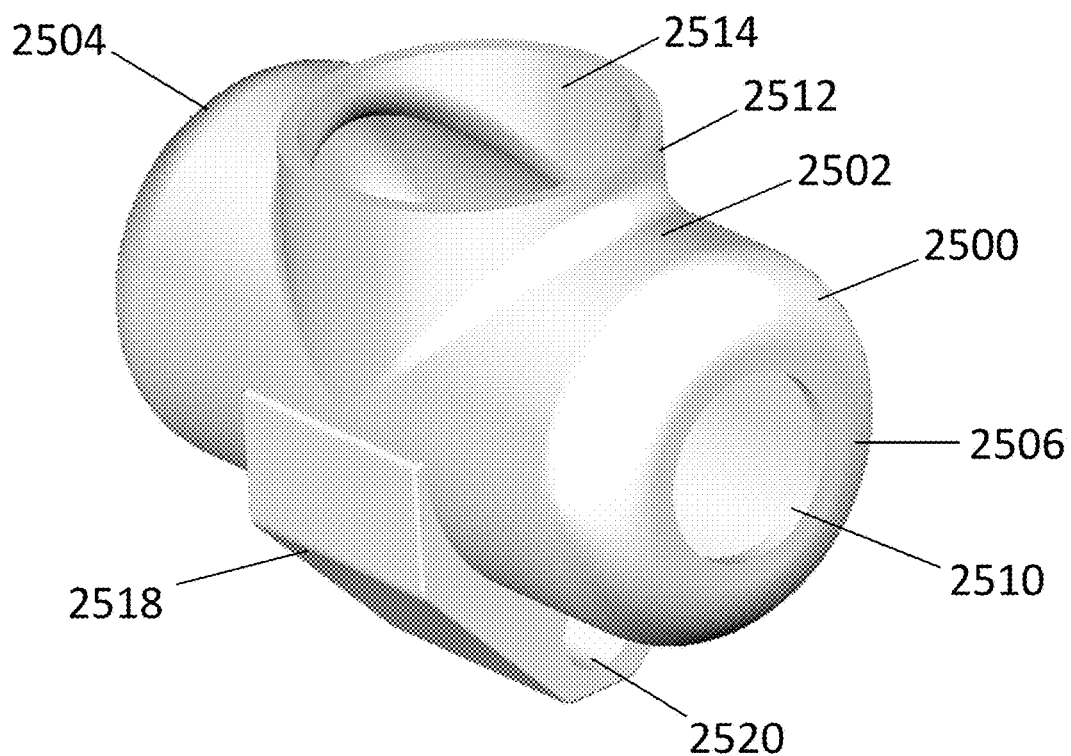
FIG. 25A shows a perspective view of a housing of the helical drive of FIG. 22.
Figure 25B:
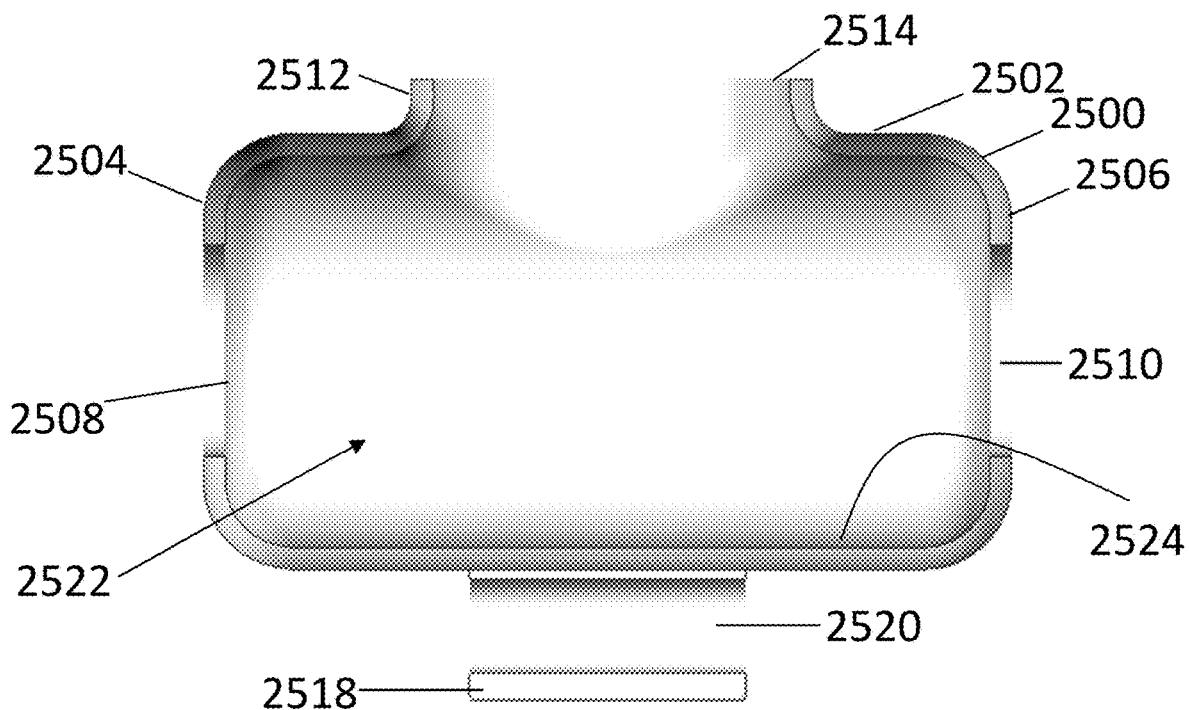
FIG. 25B shows a section view of the housing of FIG. 25A.

Referring now to FIGS. 25A and 25B, a perspective view and a section view, respectively, of the housing 2500 are shown. The housing 2500 has a hollow generally cylindrical body 2502 centered around a longitudinal axis 2550. The body 2502 that tapers to generally disc-shaped ends 2504, 2506. Circular holes 2508, 2510 extend through respective ones of the ends 2504, 2506. The holes 2508, 2510 are centered on the longitudinal axis 2550. A generally round projection 2512 extends from a first side of the body 2502. A circular hole 2514 is centered in the projection 2512 and is contiguous with the hollow center of the body 2502. A slide support 2518 extends from a second side of the body 2502 opposite the projection 2512. A bore 2520 extends through the slide support 2518 and is oriented parallel to the longitudinal axis 2550. In some embodiments, the bore 2520 supports a sliding bushing therein. In some embodiments, the sliding bushing comprises polyoxymethylene, polytetrafluoroethylene ("PTFE"), ultra high molecular weight polyethylene ("UHMWPE"), nylon, or polycarbonate. The hollow body 2502 includes an internal cavity 2522 defining an inner surface 2524. In some embodiments, the housing 2500 comprises a metal. In some embodiments, the metal is one of the metals referenced above with respect to the outer handle 2410.

Figure 26:
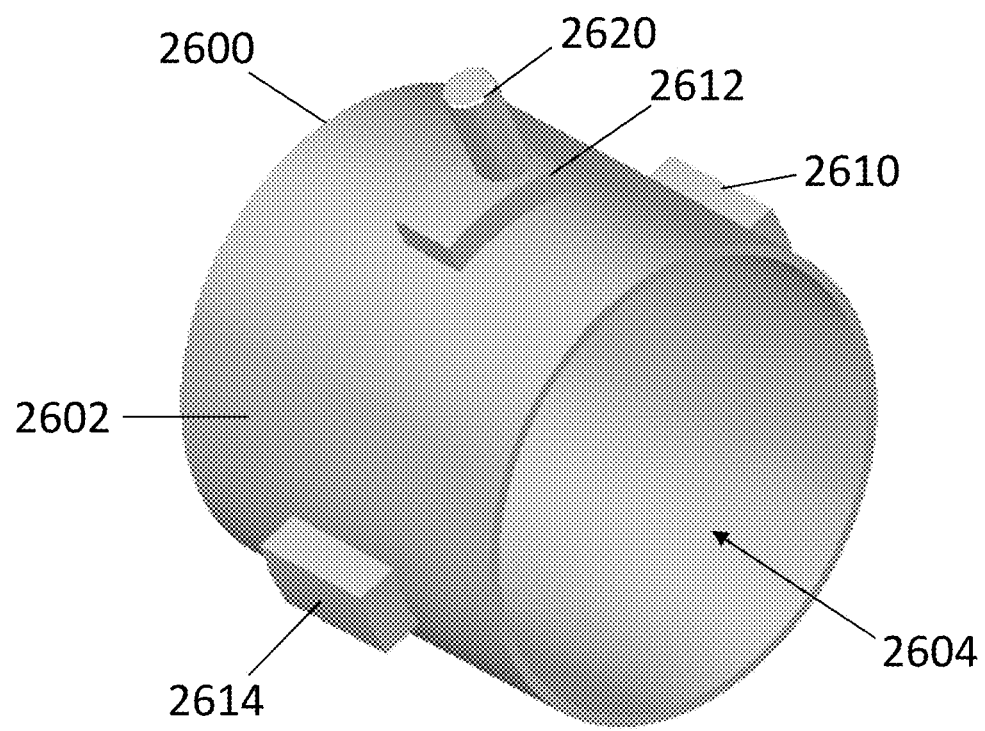
FIG. 26 shows a perspective view of a bearing housing of the helical drive of FIG. 22.

Referring now to FIG. 26, a perspective view of the bearing housing 2600 is shown. The bearing housing 2600 has a generally cylindrical body 2602 with a bore 2604 extending therethrough. The body 2602 is sized and shaped to be positioned within the internal cavity 2522 of the housing 2500 as shown in FIG. 23. Supports 2610, 2612, 2614, and 2616 (see FIG. 23) project from the body 2602. The supports 2610, 2612, 2614 and 2616 are generally centered along a length of the body 2602, and are spaced about the circumference of the body 2602. In some embodiments, the supports 2610, 2612, 2614, 2616 contact the inner surface 2524 of the housing 2500, thereby maintaining the bore 2604 of the bearing housing 2600 in alignment with the circular holes 2508, 2510 of the housing 2500. A cam pin 2620 projects from the support 2612. The cam pin 2620 is sized and shaped to be received within the cam slot 2476 of the cam mover 2470. In some embodiments, the bearing housing 2600 comprises a metal. In some embodiments, the metal is one of the metals referenced above with respect to the outer handle 2410. In some embodiments, the supports 2610, 2614, 2616 are separate elements that are joined to the bearing housing 2600. In some embodiments, the supports 2610, 2614, 2616 comprise polyoxymethylene, PTFE, UHMWPE, nylon, and/or polycarbonate.

Figure 27:
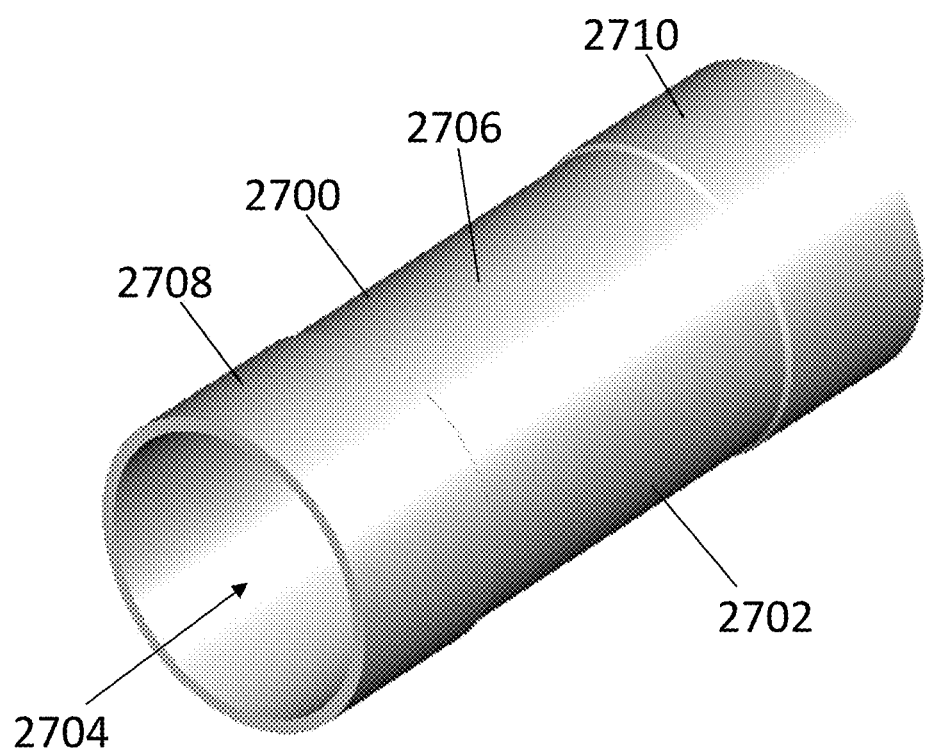
FIG. 27 shows a perspective view of a bearing control sleeve of the helical drive of FIG. 22.

Referring now to FIG. 27, a perspective view of the bearing control sleeve 2700 is shown. The bearing control sleeve 2700 has a generally cylindrical body 2702 having a bore 2704 extending therethrough. The body 2702 is sized and shaped to be received within the bore 2604 of the bearing housing 2600 as shown in FIG. 23. The body 2702 has a central portion 2706 having a first outside diameter, and end portions 2708, 2710 having a second outside diameter that is larger than the first outside diameter. In some embodiments, the bearing control sleeve 2700 comprises a metal. In some embodiments, the metal is one of the metals referenced above with respect to the outer handle 2410.

Figure 28:
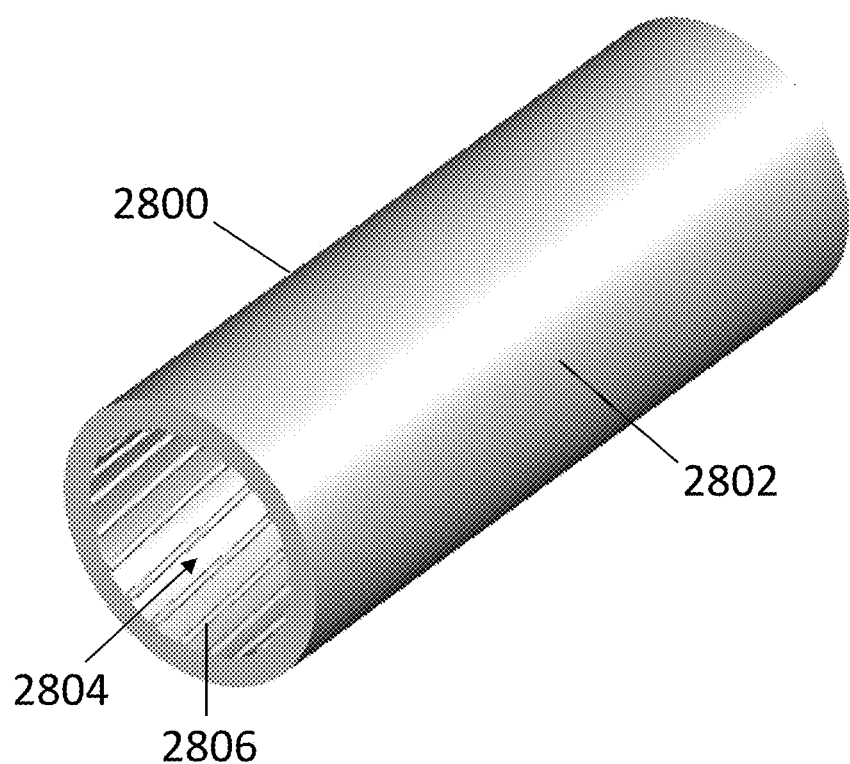
FIG. 28 shows a perspective view of a helical sleeve of the helical drive of FIG. 22.

Referring now to FIG. 28, a perspective view of the helical sleeve 2800 is shown. In some embodiments, the helical sleeve 2800 comprises polyoxymethylene. In some embodiments, the helical sleeve 2800 comprises PTFE, UHMWPE, nylon, polycarbonate, or another polymer possessing sufficiently high strength, low friction, and anti-galling properties to perform as will be described hereinafter. In some embodiments, the helical sleeve 2800 comprises a metal having sufficiently high strength, low-friction, and anti-galling properties to perform as will be described hereinafter, such as a Babbitt metal or a bronze alloy. The helical sleeve 2800 has a generally cylindrical body 2802 that is sized and shaped to be received within the bore 2704 of the bearing control sleeve 2700 as shown in FIG. 23, in a manner such that the bearing control sleeve 2700 and the helical sleeve 2800 rotate together about the longitudinal axis 2205 of the drive system 2200. In some embodiments, the helical sleeve 2800 is secured to the bearing control sleeve 2700 by one or more of a press fit, an adhesive, and/or a key (e.g., a kay comprising a carbon steel alloy, such as grade 1018 or grade 1045 carbon steel). The helical sleeve 2800 has a bore 2804 extending through the body 2802 and internal threads 2806 projecting inwardly into the bore 2804. The bore 2804 and threads 2806 are sized and shaped to matingly receive the helical shaft 3100 as will be discussed in further detail hereinafter.

Figure 29:
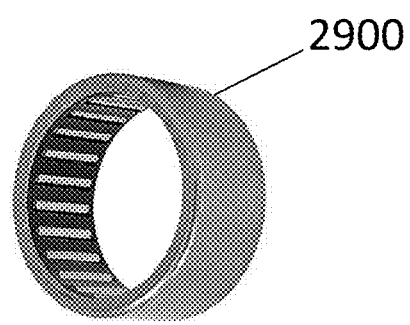
FIG. 29 shows a perspective view of a one-way bearing of the helical drive of FIG. 22.

Referring now to FIG. 29, the bearing 2900 is shown. In some embodiments, the bearing 2900 is a one-way needle roller bearing having a sleeve 2910 and internal rollers 2920. In some embodiments, the bearing 2900 is configured to allow free rotation of the rollers 2920 in one direction and to prevent rotation of the rollers 2920 in an opposite second direction. In some embodiments, the bearing 2900 is the one-way needle roller bearing commercialized under the trade name HF3520 by NationSkander California Corporation of Anaheim, Calif. In some embodiments, the bearing 2950 is a one-way needle roller bearing having a sleeve 2960 and internal rollers 2970. In some embodiments, the bearing 2960 is configured to allow free rotation of the rollers 2970 in one direction and to prevent rotation of the rollers 2970 in an opposite second direction. In some embodiments, the bearing 2950 is the one-way needle roller bearing commercialized under the trade name HF3520 by NationSkander California Corporation of Anaheim, Calif. In some embodiments, the bearing 2950 is identical to the bearing 2900.

Figure 30:
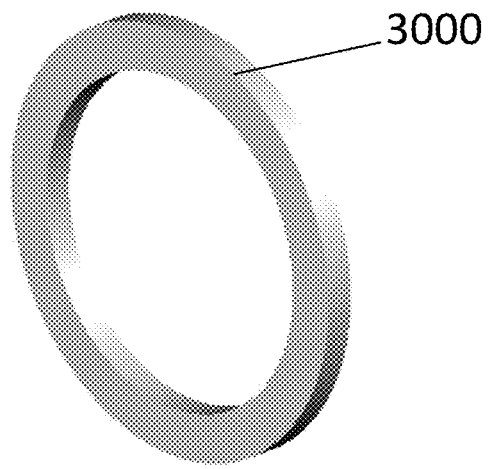
FIG. 30 shows a perspective view of a spacer of the helical drive of FIG. 22.

Referring now to FIG. 30, the spacer 3000 is shown. In some embodiments, the spacer 3000 is ring-shaped. In some embodiments, the spacer 3000 is sized and shaped to fit around the end portion 2708 of the bearing control sleeve 2700 and to abut the inner surface 2524 of the housing 2500, thereby supporting the positioning of the bearing control sleeve 2700 within the housing 2500 in a position and orientation such that the bore 2704 of the bearing control sleeve is aligned with the holes 2508 of the housing 2500. In some embodiments, the spacer 3050 is sized and shaped to fit around the end portion 2710 of the bearing control sleeve 2700 and to abut the inner surface 2524 of the housing 2500, thereby supporting the positioning of the bearing control sleeve 2700 within the housing 2500 in a position and orientation such that the bore 2704 of the bearing control sleeve is aligned with the holes 2510 of the housing 2500. In some embodiments, the spacer 3050 is identical to the spacer 3000. In some embodiments, the spacers 3000, 3050 comrpise polyoxymethylene, polytetrafluoroethylene ("PTFE"), ultra high molecular weight polyethylene ("UHMWPE"), nylon, or polycarbonate. The hollow body 2502 includes an internal cavity 2522 defining an inner surface 2524.

Figure 31:
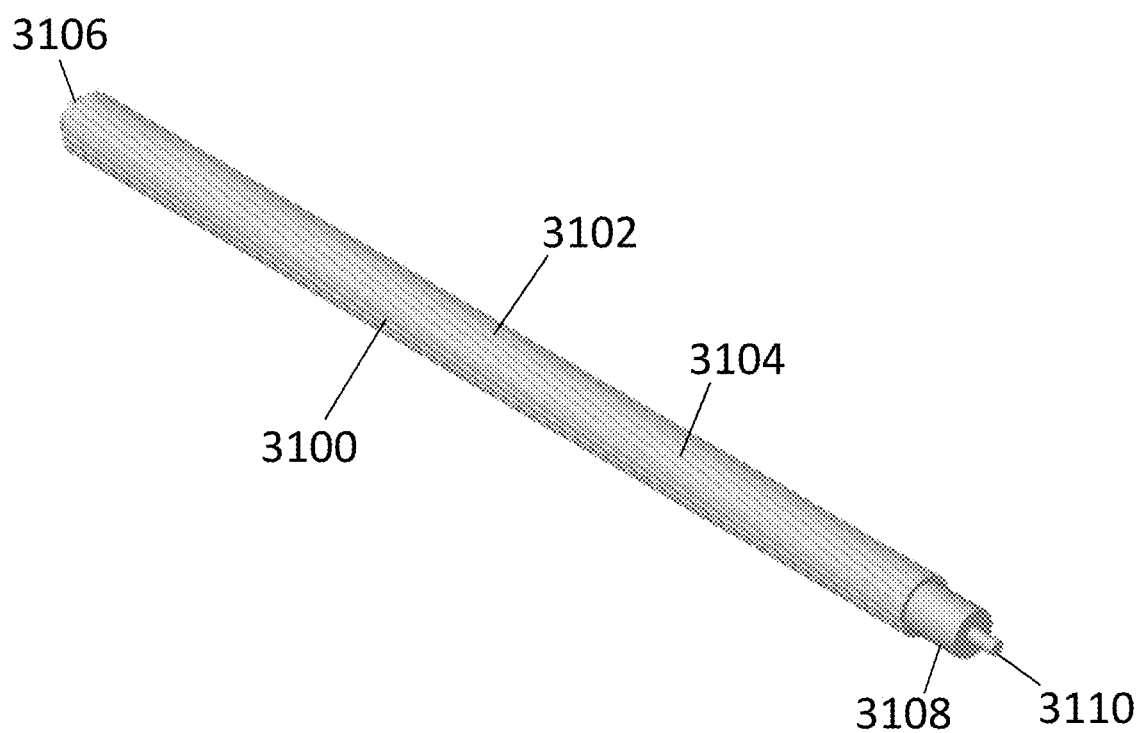
FIG. 31 shows a perspective view of a helical member of the helical drive of FIG. 22.

Referring now to FIG. 31, the helical member 3100 is shown. In some embodiments, the helical member 3100 is generally similar to the helical member 700 shown in FIGS. 7A-7C. In some embodiments, the helical member 3100 includes an elongate body 3102 having a "negative" helix 3104 formed therein. In some embodiments, the helix 3104 is sized and shaped to receive the threads 2806 of the helical sleeve 2800. In some embodiments, the helical member 3100 includes a first projection 3106 extending from first end thereof and a second projection 3108 extending from an opposite second end thereof. In some embodiments, the helical member 3100 includes a gear rod 3110 extending from the second projection 3108. In some embodiments, the helical member 3100 is made of formed stainless steel. In some embodiments, the helical member 3100 is made of a chromium-nickel stainless steel alloy. In some embodiments, the helical member 3100 is made of type 301 stainless steel. In some embodiments, the helical member 3100 is made from a cold-rolled bead-blasted stainless steel. In some embodiments, the helical member 3100 is formed using a three-axis CNC helical forming machine. In some embodiments, the helical member 3100 is formed using a helix forming machine such as those commercialized by Helix Flight Manufacturing Machines of Auckland, New Zealand. In some embodiments, the helical member 3100 is formed using a spring forming machine.

Figure 32:
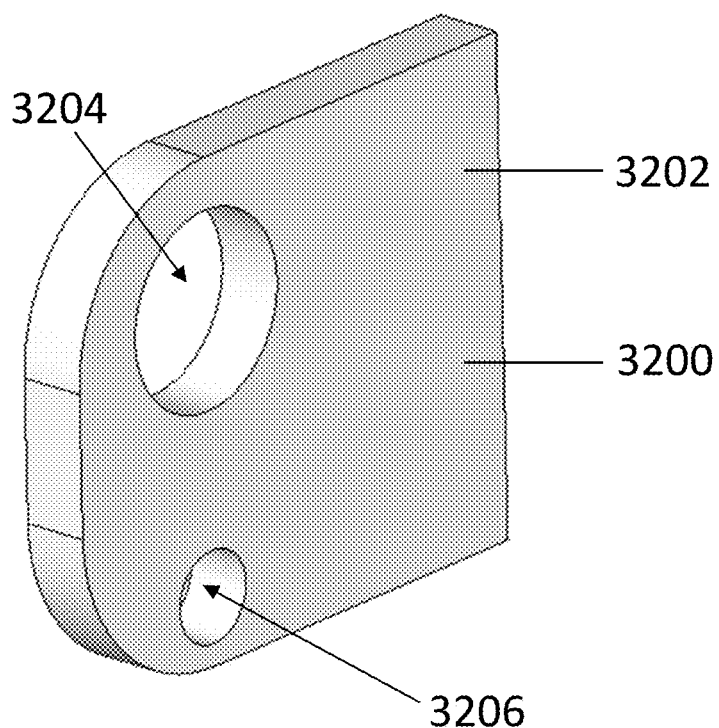
FIG. 32 shows a perspective view of a first end housing of the helical drive of FIG. 22.

Referring now to FIG. 32, the first end housing 3200 is shown. The first end housing 3200 has a generally flat body 3202; however, it will be apparent to those of skill in the art that this is only exemplary and other shapes may be appropriate depending on the nature of the device that is to be powered by the drive system 2200. In some embodiments, the body 3200 includes a first hole 3204 and a second hole 3206. In some embodiments, the first end housing 3200 comprises a metal. In some embodiments, the metal is one of the metals referenced above with respect to the outer handle 2410.

Figure 33:
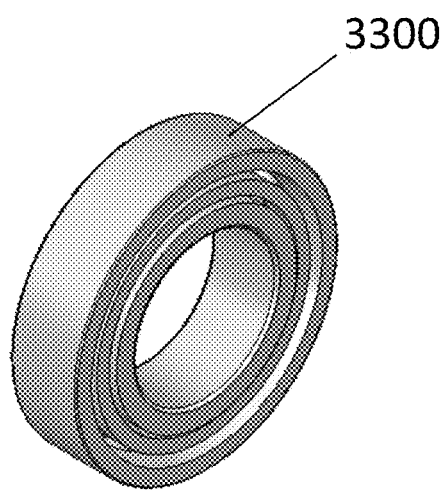
FIG. 33 shows a perspective view of an end bearing of the helical drive of FIG. 22.

Referring now to FIG. 33, the end bearing 3300 is shown. In some embodiments, the end bearing 3300 is configured to be received and retained in the hole 3204 of the first end housing 3200. In some embodiments, the end bearing 3300 is a roller bearing that is configured to receive and retain therein the first projection 3106 of the helical member 3100, and to allow the helical member 3100 to rotate freely about the longitudinal axis 2205 with respect to the first end housing. In some embodiments, the end bearing 3300 is the bearing commercialized as model number 7902A5 by NSK Limited of Tokyo, Japan.

Figure 34:
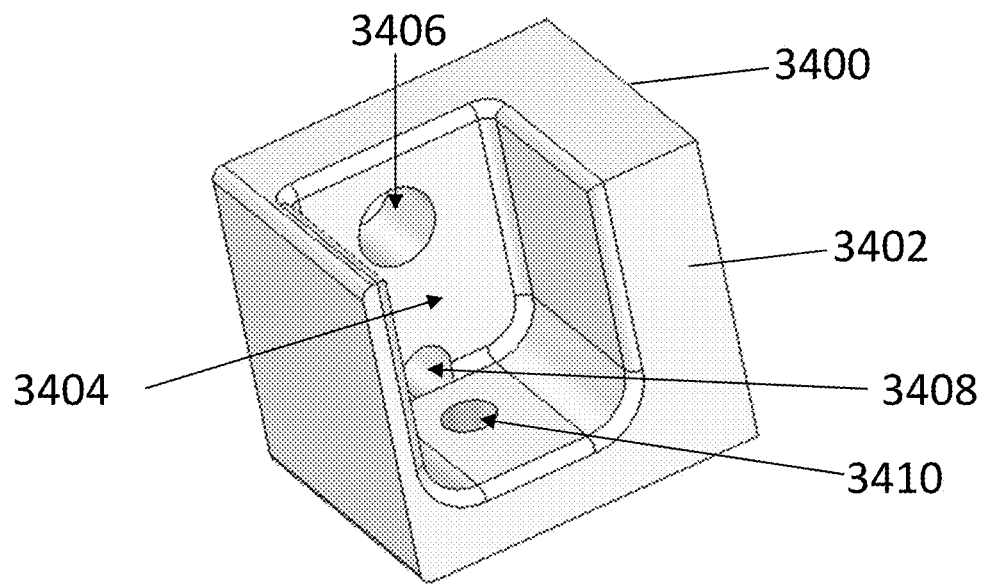
FIG. 34 shows a perspective view of a second end housing of the helical drive of FIG. 22.

Referring now to FIG. 34, the second end housing 3400 is shown. In some embodiments, the second end housing 3400 includes a solid body 3402 with a cavity 3404 formed therein. In some embodiments, the second end housing 3400 includes first and second holes 3406, 3408 extending from the cavity 3404 through a first side of the body 3402. In some embodiments, the second end housing 3400 includes a third hole 3410 extending from the cavity 3404 through an adjacent second side of the body 3402. In some embodiments, the first hole 3406 is sized and shaped to receive the second projection 3108 of the helical member 3100 and to allow the second projection 3108 to rotate within the first hole 3406. In some embodiments, the second end housing 3400 comprises a metal. In some embodiments, the metal is one of the metals referenced above with respect to the outer handle 2410.

Figure 35:
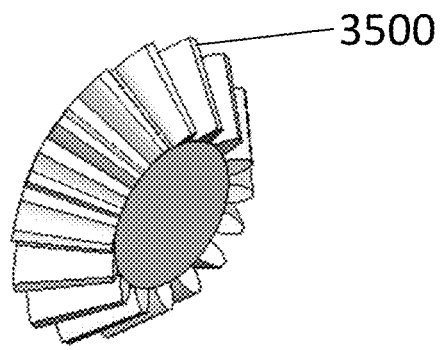
FIG. 35 shows a perspective view of a bevel gear of the helical drive of FIG. 22.

Referring now to FIG. 35, the bevel gear 3500 is shown. In some embodiments, the bevel gear 3500 is configured to engage the gear rod 3110 of the helical member 3100. In some embodiments, the bevel gear 3500 is configured to convey output torque generated by the drive system 2200, as will be described in detail hereinafter. Referring back to FIG. 34, in some embodiments, the bevel gear 3500 engages another gear connected to a drive member that extends through the third hole 3410 of the second end housing 3400. In some embodiments, the bevel gear 3500 comprises a metal. In some embodiments, the bevel gear 3500 comprises a carbon steel. In some embodiments, the bevel gear 3500 comprises a grade 1144 or grade 1177 carbon steel alloy.

Figure 36:
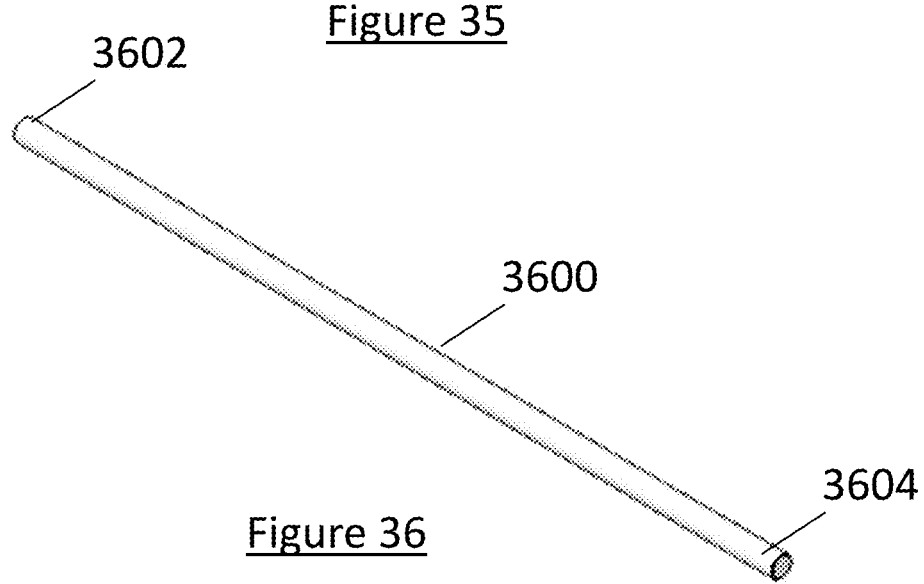
FIG. 36 shows a perspective view of a slider rod of the helical drive of FIG. 22.

Referring now to FIG. 36, the slider rod 3600 is shown. In some embodiments, the slider rod 3600 has a first end 3602 and an opposite second end 3604. In some embodiments, the first end 3602 is configured to be received by the second hole 3206 of the first end housing 3200 and retained therein in a fixed and non-moving engagement. In some embodiments, the second end 3604 is configured to be received by the second hole 3408 of the second end housing 3400 and retained therein in a fixed and non-moving engagement. In some embodiments, the slider rod 3600 comprises a metal. In some embodiments, the metal is one of the metals referenced above with respect to the outer handle 2410.

Referring now to FIGS. 23, 26, and 29, the bore 2604 of the bearing housing 2600 is sized and shaped to securely receive the bearings 2900, 2950 therein, such that the bearing housing 2600, and the bearings 2900, 2950 move together (e.g., along the longitudinal axis 2205 of the drive system 2200). In some embodiments, the bearings 2900, 2950 are secured within the bore 2604 of the bearing housing 2600 by a press fit.

Referring now to FIGS. 23, 27 and 29, the central portion 2706 of the bearing control sleeve 2700 is sized such that the bearings 2900, 2950 can be positioned around the central portion 2706 as shown in FIG. 23 in a manner such that the rollers 2920, 2970 of the bearings 2900, 2950 do not contact the central portion 2706 of the bearing control sleeve 2700. As a result, when the bearings 2900, 2950 are positioned as shown in FIG. 23, the bearing control sleeve 2700 can rotate freely in either direction about the longitudinal axis 2205 with respect to the bearings 2900, 2950 (and, thereby, with respect to the bearing housing 2600). The end portions 2708, 2710 of the bearing control sleeve 2700 are sized such that the bearings 2900, 2950 can be positioned around respective ones of the end portions 2708, 2710 in a manner such that the rollers 2920, 2970 contact the respective end portions 2708, 2710 of the bearing control sleeve 2700. When the rollers 2920, 2970 contact the respective end portions 2708, 2710 of the bearing control sleeve, the one-way operation of the bearings 2900, 2950 allows the bearing control sleeve 2700 to rotate freely in one direction about the longitudinal axis 2205 with respect to the bearings 2900, 2950 (and, thereby, with respect to the bearing housing 2600). The bearings 2900, 2950 are oriented in rotationally opposite directions, such that they constrain rotational motion in opposite directions from one another.

Figure 37:
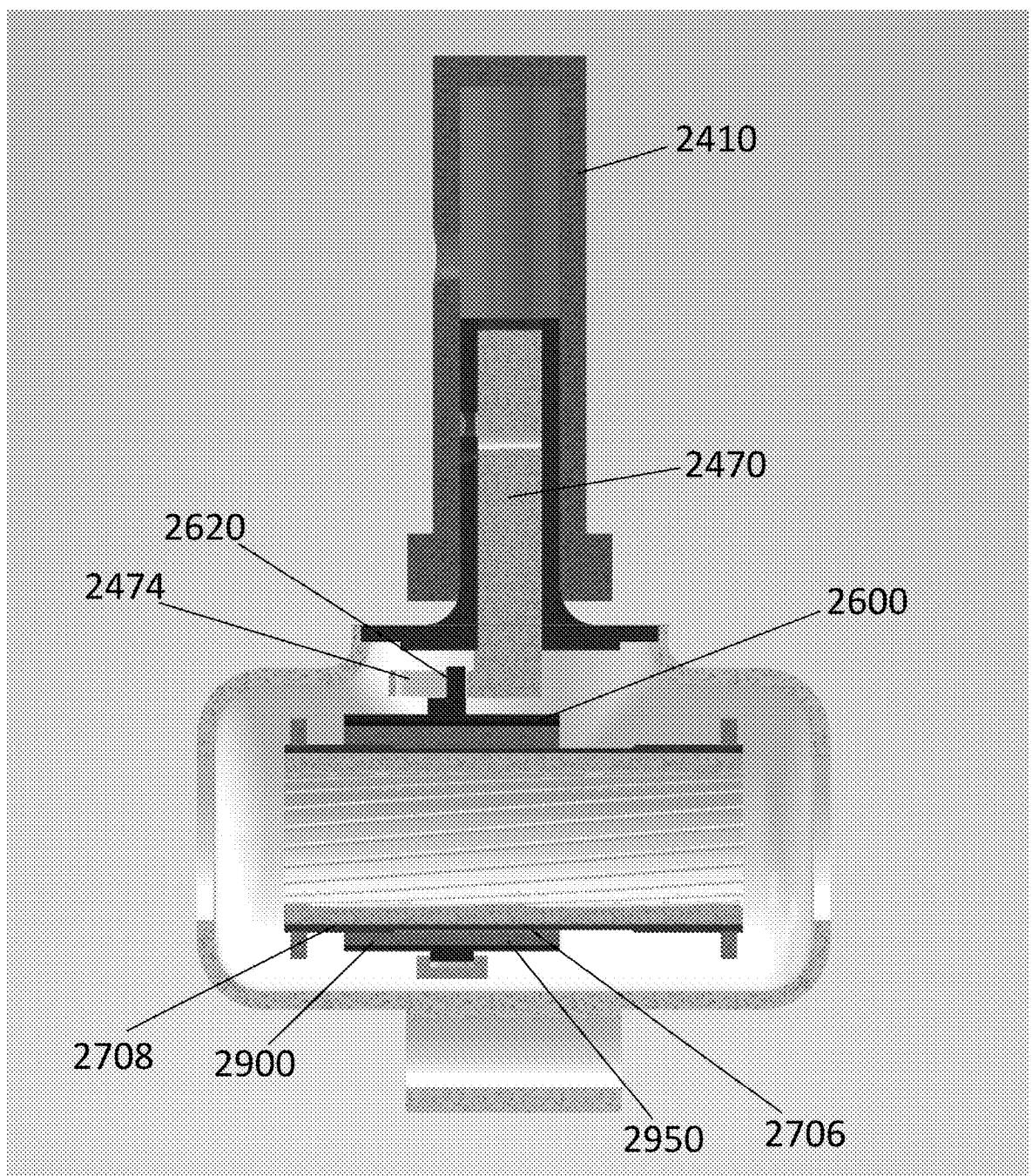
FIG. 37 shows a section view of the control system of FIG. 23, a handle assembly having been actuated to position the control system in a "forward" configuration.

For example, FIG. 37 shows the control system 2300 positioned such that the bearing housing 2600 and the bearings 2900, 2950 have been moved longitudinally along the longitudinal axis 2205 in a direction toward the end portion 2708 of the bearing control sleeve 2700. As a result, the rollers 2920 of the bearing 2900 contact the end portion 2708, while the rollers 2970 of the bearing 2950 remain aligned with, and do not contact, the central portion 2706 of the bearing control sleeve 2700. In some embodiments, when the bearing 2900 is positioned in this manner (i.e., with the rollers 2920 contacting the end portion 2708), the control sleeve 2700 is allowed to rotate freely with respect to the bearing housing 2600 in a first direction about the longitudinal axis 2205, but is prevented from rotating with respect to the bearing housing 2600 in a second direction about the longitudinal axis 2205.

Figure 38:
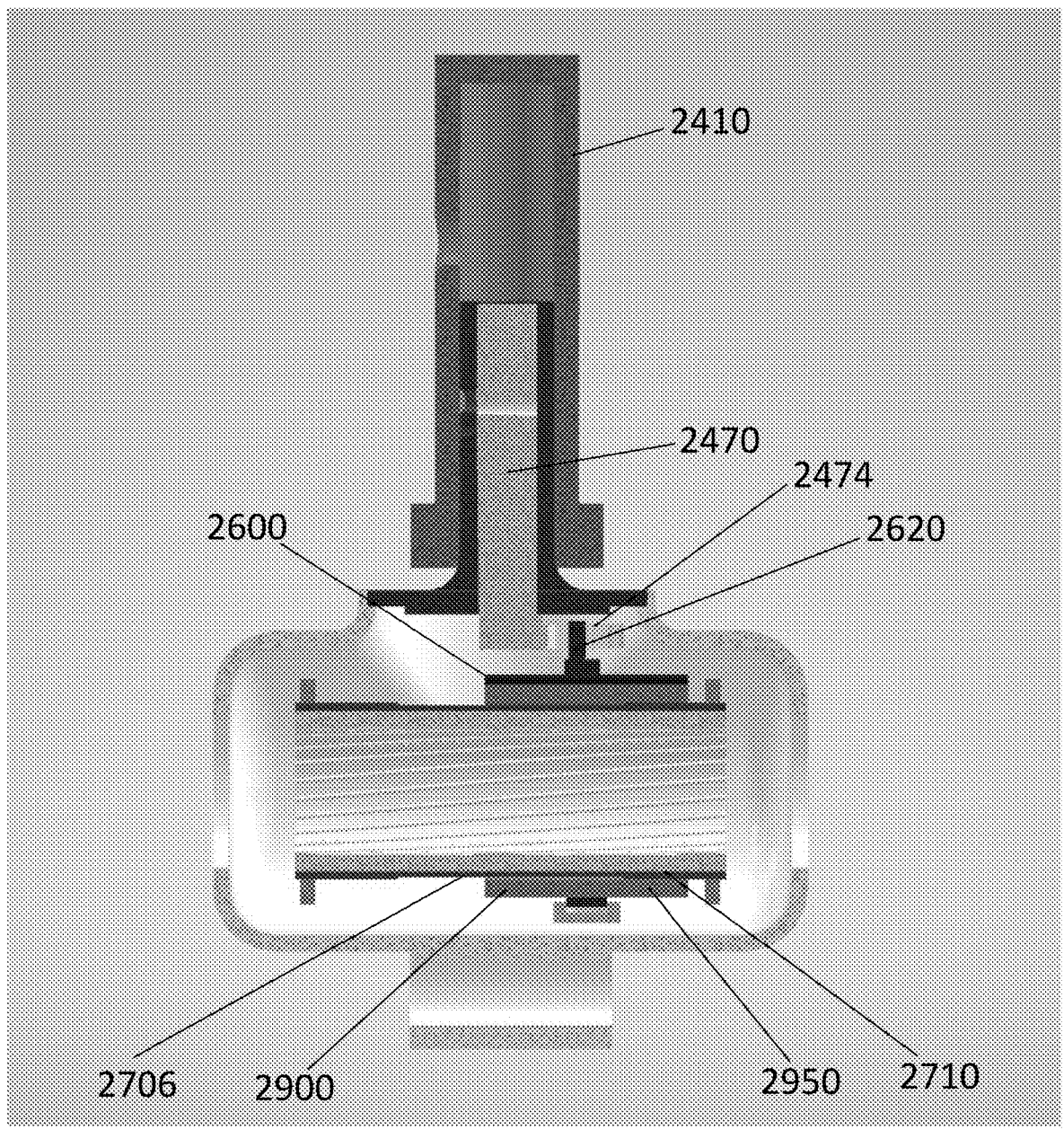
FIG. 38 shows a section view of the control system of FIG. 23, a handle assembly having been actuated to position the control system in a "reverse" configuration.

FIG. 38 shows the control system 2300 such that the bearing housing 2600 and the bearings 2900, 2950 have been moved longitudinally along the longitudinal axis 2205 in a direction toward the end portion 2710 of the bearing control sleeve 2700. As a result, the rollers 2970 of the bearing 2950 contact the end portion 2710, while the rollers 2920 of the bearing 2900 remain aligned with, and do not contact, the central portion 2706 of the bearing control sleeve 2700. In some embodiments, when the bearing 2900 is positioned in this manner (i.e., with the rollers 2970 contacting the end portion 2710), the bearing control sleeve 2700 is allowed to rotate freely with respect to the bearing housing 2600 in the second direction about the longitudinal axis 2205 (e.g., the direction in which the bearing control sleeve 2700 is constrained from rotation when the bearing housing 2600 is positioned as shown in FIG. 37), but is prevented from rotating with respect to the bearing housing 2600 in the first direction about the longitudinal axis 2205 (e.g., the direction in which the bearing control sleeve 2700 is constrained from rotation when the bearing housing 2600 is positioned as shown in FIG. 37.

Referring now to FIGS. 23 and 24, actuation of the handle assembly 2400 is described. In some embodiments, the outer handle 2410 is positioned such that a user can grip the gripping surface 2414. The handle assembly 2400 engages the housing 2500 in a manner such that the user can grip the gripping surface 2414 and rotate the outer handle 2410 about the handle axis 2402. Rotation of the outer handle 2410 causes corresponding rotation of the cam mover 2470 about the handle axis 2402. When the cam mover 2470 rotates about the handle axis 2402, the cam slot 2476 is repositioned, thereby acting as a cam in cooperation with the cam pin 2620 and driving movement of the bearing housing 2600 along the longitudinal axis 2205.

Referring now to FIGS. 23, 24, 37, and 38, the handle assembly 2400 and the bearing housing 2600 are configured such that the handle assembly 2400 can be positioned in a "neutral" position, can be rotated about the handle axis 2402 in a first direction reach a "forward" position, and can be rotated about the handle axis 2402 in an opposing second direction to reach a "reverse" position. In the "neutral" position, as shown in FIG. 23, the bearing housing 2600 is positioned such that the bearings 2900, 2950 are both aligned with the central portion 2706 of the bearing control sleeve 2700, as a result of which the bearing control sleeve 2700 can rotate freely in either direction about the longitudinal axis 2205 with respect to the bearing housing 2600. In the "forward" position, as shown in FIG. 37, the bearing housing 2600 is positioned such that the bearing 2900 is aligned with the end portion 2708 of the bearing control sleeve 2700 and the bearing 2950 is aligned with the central portion 2706 of the bearing control sleeve 2700, as a result of which the bearing control sleeve 2700 can rotate freely in a first direction about the longitudinal axis 2205 with respect to the bearing housing 2600, but is prevented from rotating in an opposing second direction about the longitudinal axis 2205 with respect to the bearing housing 2600. In the "reverse" position, as shown in FIG. 38, the bearing housing 2600 is positioned such that the bearing 2950 is aligned with the end portion 2710 of the bearing control sleeve 2700 and the bearing 2900 is aligned with the central portion 2706 of the bearing control sleeve 2700, as a result of which the bearing control sleeve 2700 can rotate freely in the second direction about the longitudinal axis 2205 with respect to the bearing housing 2600, but is prevented from rotating in the first direction about the longitudinal axis 2205 with respect to the bearing housing 2600. As a result, rotation of the handle assembly 2400 about the handle axis controls the direction in which the bearing control sleeve 2700 is allowed to rotate.

Figure 22:
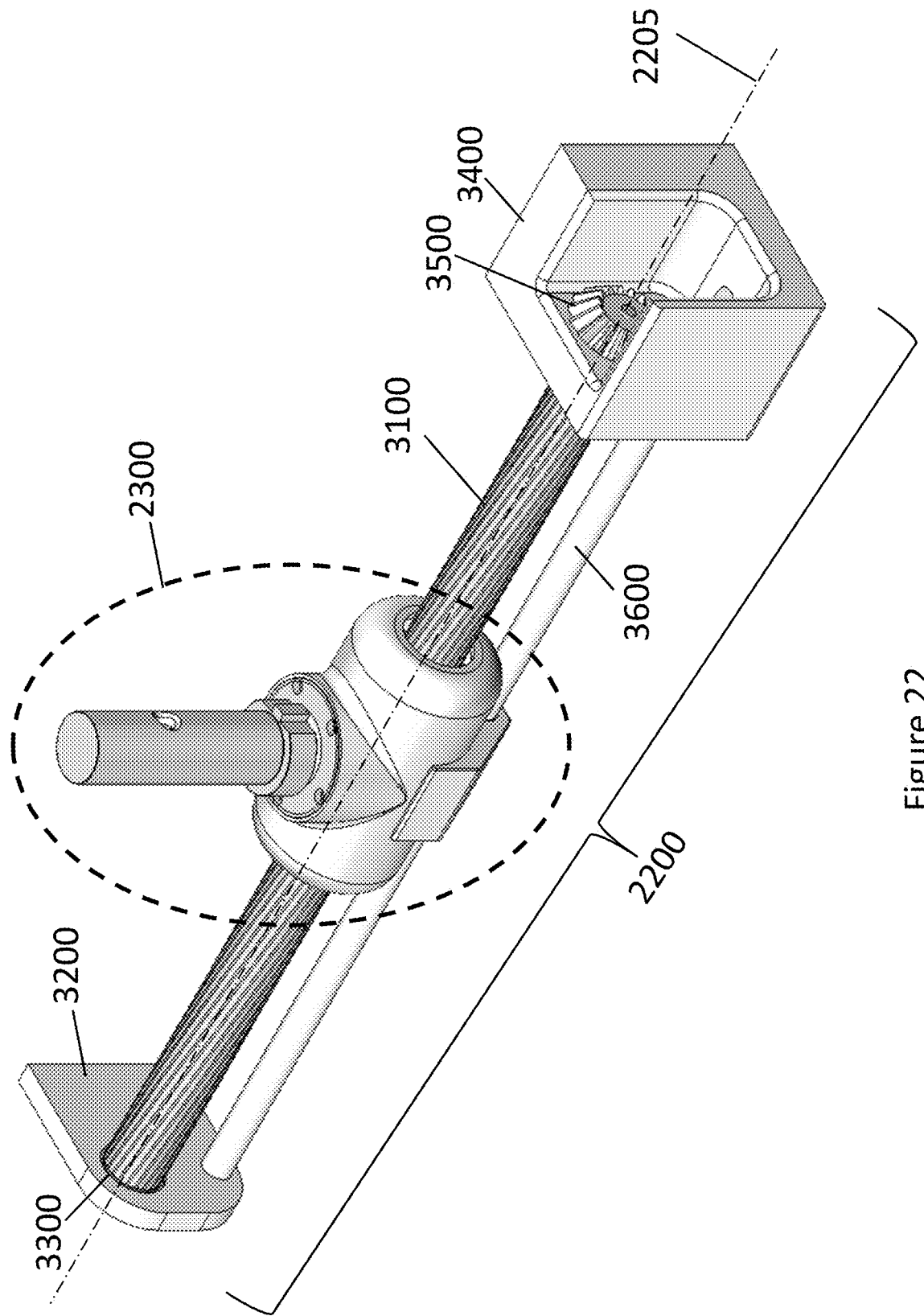
FIG. 22 shows a perspective view of a third exemplary embodiment of a helical drive.

Referring now to FIGS. 22 and 23, the drive system 2200 and the control system 2300 are described. In some embodiments, the end bearing 3300 is received in the first hole 3204 of the first end housing 3200. In some embodiments, the first end 3106 of the helical member 3100 is received by the end bearing 3300. In some embodiments, the first end 3602 of the slider rod 3600 is received and retained in the second hole 3204 of the first end housing 3200. In some embodiments, the control system 2300, assembled as shown in FIG. 23, engages the helical member 3100 and the slider rod 3600 by receiving the helical member 3100 within the bore 2704 of the helical sleeve 2800 and by receiving the slider rod 3600 within the bore 2520 of the housing 2500. In some embodiments, the second end housing 3400 is engaged to the drive system 2200 by passing the second projection 3108 of the helical member 3100 through the first hole 3406 of the second end housing 3400, and by fixing the second end 3604 of the slider rod 3600 in the second hole 3408 of the second end housing 3400. In some embodiments, the helical member 3100 is secured to the second end housing 3400 by engaging the bevel gear 3500 to the gear rod 3110 of the helical member 3100. In some embodiments, with the drive system 2200 assembled as described above, the control system 2300 can slide freely along the slider rod 3600. In some embodiments, motion of the control system 2300 with respect to the helical member 3100 operates as described hereinafter.

Referring to FIGS. 22 and 23, as described above, when the handle assembly 2400 is in the "neutral" position as shown in FIG. 22, the bearing control sleeve 2700, and the helical sleeve 2800 received fixedly therein, are allowed to rotate freely about the longitudinal axis 2205 with respect to the bearing housing 2600. Consequently, when force is applied to the handle assembly 2400 so as to move the control system 2300 in either direction along the longitudinal axis 2205, the internal threads 2806 of the helical sleeve 2800 are forced against the helix 3104 of the helical member 3100. Because the bearing control sleeve 2700 and the helical sleeve 2800 are not constrained from rotation about the longitudinal axis 2205, such force against the helix 3104 causes the bearing control sleeve 2700 and the helical sleeve

2800 to rotate about the longitudinal axis 2205 with respect both to the helical member 3100 and to the bearing housing 2600, enabling the internal threads 2806 of the helical sleeve 2800 to rotate within the helix 3104 of the helical member 3100. As a result, the helical member 3100 is not rotated about the longitudinal axis 2205, and no torque is generated at the bevel gear 3500 in either direction.

Referring to FIGS. 22 and 37, as described above, when the handle assembly 2400 is in the "forward" position as shown in FIG. 37, the bearing control sleeve 2700, and the helical sleeve 2800 received fixedly therein, are allowed to rotate freely about the longitudinal axis 2205 in a first direction with respect to the bearing housing 2600, but are constrained from rotating about the longitudinal axis 2205 in an opposite second direction with respect to the bearing housing due to the engagement of the bearing 2900 with the end 2708 of the bearing control sleeve 2700. Consequently, when force is applied to the handle assembly 2400 so as to move the control system 2300 in a first direction along the longitudinal axis 2205, the first direction corresponding to the first direction of rotation of the bearing control sleeve 2700 and the helical sleeve 2800, the bearing control sleeve 2700 and the helical sleeve 2800 rotate in the first direction about the longitudinal axis 2205 as described above with reference to the "neutral" position, the helical member 3100 is not rotated about the longitudinal axis 2205, and no torque is generated at the bevel gear 3500. Conversely, when force is applied to the handle assembly 2400 so as to move the control system 2300 in a second direction along the longitudinal axis 2205, the second direction being opposite the first direction and corresponding to the second direction of rotation of the bearing control sleeve 2700 and the helical sleeve 2800, the internal threads 2806 of the helical sleeve 2800 are forced against the helix 3104 of the helical member. However, due to the engagement of the bearing 2900 with the end 2708 of the bearing control sleeve 2700, the helical sleeve 2800 and the bearing control sleeve 2700 are not allowed to rotate in the second direction with respect to the bearing housing 2600. As a result, the applied force causes the helical member 3100 to rotate about the longitudinal axis 2205 in order for the helix 3104 to remain in engagement with the internal threads 2806 of the helical sleeve 2800 as the helical sleeve 2800 (along with the remainder of the control system 2300) moves along the longitudinal axis, thereby generating a torque at the bevel gear 3500. Consequently, when the handle assembly 2400 is in the "forward" position, linear motion of the control system 2300 in the first direction does not generate a torque at the bevel gear 3500, but linear motion of the control system 2300 in the second direction generates a "forward" torque at the bevel gear 3500.

Referring to FIGS. 22 and 38, as described above, when the handle assembly 2400 is in the "reverse" position as shown in FIG. 38, the bearing control sleeve 2700, and the helical sleeve 2800 received fixedly therein, are allowed to rotate freely about the longitudinal axis 2205 in a the second direction with respect to the bearing housing 2600, but are constrained from rotating about the longitudinal axis 2205 in the first direction with respect to the bearing housing due to the engagement of the bearing 2950 with the end 2710 of the bearing control sleeve 2700. Consequently, when force is applied to the handle assembly 2400 so as to move the control system 2300 in the second direction along the longitudinal axis 2205, the second direction corresponding to the second direction of rotation of the bearing control sleeve 2700 and the helical sleeve 2800, the bearing control sleeve 2700 and the helical sleeve 2800 rotate in the second direction about the longitudinal axis 2205 as described above with reference to the "neutral" position, the helical member 3100 is not rotated about the longitudinal axis 2205, and no torque is generated at the bevel gear 3500. Conversely, when force is applied to the handle assembly 2400 so as to move the control system 2300 in the first direction along the longitudinal axis 2205, the first direction being opposite the second direction and corresponding to the first direction of rotation of the bearing control sleeve 2700 and the helical sleeve 2800, the internal threads 2806 of the helical sleeve 2800 are forced against the helix 3104 of the helical member. However, due to the engagement of the bearing 2950 with the end 2710 of the bearing control sleeve 2700, the helical sleeve 2800 and the bearing control sleeve 2700 are not allowed to rotate in the first direction with respect to the bearing housing 2600. As a result, the applied force causes the helical member 3100 to rotate about the longitudinal axis 2205 in order for the helix 3104 to remain in engagement with the internal threads 2806 of the helical sleeve 2800 as the helical sleeve 2800 (along with the remainder of the control system 2300) moves along the longitudinal axis, thereby generating a torque at the bevel gear 3500 that is opposite to the torque generated as discussed above with reference to FIG. 37. Consequently, when the handle assembly 2400 is in the "reverse" position, linear motion of the control system 2300 in the second direction does not generate a torque at the bevel gear 3500, but linear motion of the control system 2300 in the first direction generates a "reverse" torque at the bevel gear 3500.

Summarizing the above discussion of the drive system 2200 and the control system 2300, the handle assembly 2400 can be rotated by a user to place the control system 2300 in either a "neutral" position, a "forward" position, or a "reverse" position. When the control system 2300 is in the "neutral" position, the user can apply force to the handle assembly to move the control system 2300 along the helical member 3100 in either direction, and motion in either direction results in free movement of the control system 2300 without generation of any output torque at the bevel gear 3500. When the control system 2300 is in the "forward" position, the user can apply force to the handle to move the control system 2300 along the helical member 3100 in a first direction, and such motion generates an output torque in a first (e.g., forward) torque direction at the bevel gear 3500. However, while the control system 2300 is in the "forward" position, the user can apply force to the handle to move the control system 2300 along the helical member 3100 in a second direction that is opposite the first direction, and such motion generates no output torque at the bevel gear 3500. When the control system 2300 is in the "reverse" position, the user can apply force to the handle to move the control system 2300 along the helical member 3100 in the second direction, and such motion generates an output torque in a second (e.g., reverse) torque direction that is opposite the first torque direction at the bevel gear 3500. However, while the control system 2300 is in the "reverse" position, the user can apply force to the handle to move the control system 2300 along the helical member 3100 in the first direction, and such motion generates no output torque at the bevel gear 3500. In some embodiments, the drive system 2200 is suitable for use in human-powered devices, such as a wheelchair, in which a user may wish to be able to apply a linear force to thereby generate output torque in two opposed directions.

While a number of embodiments of the present invention have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

What is claimed is:

1. A device, comprising:
   a frame;
   an actuator including a handle, wherein the actuator is attached to the frame and slidaby movable with respect to the frame along a linear axis;
   a helical member positioned within the frame, wherein the helical member includes at least one helical depression formed therein, and wherein the helical member is rotatably movable with respect to the frame about a helical axis of the helical member, wherein the helical axis is parallel to the linear axis;
   wherein the handle is operable to selectively position the device in a selected one of (1) a neutral position, (2) a forward position, or (3) a reverse position, wherein the actuator and the helical member are configured to cooperate with one another such that:
   (1) motion of the actuator along the linear axis in a first linear direction while the handle is positioned in its forward position causes corresponding rotation of the helical member about the helical axis in a first rotational direction with respect to the frame,
   (2) motion of the actuator along the linear axis in the first linear direction while the handle is positioned (a) in its neutral position or (b) in its reverse position does not cause rotation of the helical member about the helical axis with respect to the frame,
   (3) motion of the actuator along the linear axis in a second linear direction that is opposite the first linear direction while the handle is positioned in its reverse position causes corresponding rotation of the helical member about the helical axis with respect to the frame in a second rotational direction that is opposite the first rotational direction, and
   (4) motion of the actuator along the linear axis in the second linear direction while the handle is positioned (a) in its neutral position or (b) in its forward position does not cause rotation of the helical member about the helical axis with respect to the frame.

2. The device of claim 1, further comprising:
   at least one follower bearing, wherein each of the at least one follower bearing is positioned on a portion of the actuator so as to reduce friction between the actuator and the helical member when the actuator is moved along the linear axis so as to cause the helical member to rotate about the helical axis.

3. The device of claim 2, wherein the at least one follower bearing includes a first follower bearing positioned to a first side of the helical member and a second follower bearing positioned to a second side of the helical member that is opposite the first side of the helical member.

4. The device of claim 1, further comprising at least one plain bearing positioned on a portion of the frame so as to reduce friction between the helical member and the frame when the helical member rotates about the helical axis.

5. The device of claim 1, wherein the helical member has a helical pitch of between 85 millimeters and 95 millimeters.

6. The device of claim 1, wherein the helical member has a lead angle of between 24 degrees and 27 degrees.

7. The device of claim 1, wherein the helical member has a pitch diameter of between 48 millimeters and 52 millimeters.

8. The device of claim 1, wherein the helical member comprises one of a positive helical form or a negative helical form.

9. The device of claim 1, wherein the helical member is coupled to a drive shaft,
   wherein rotation of the helical member about the helical axis with respect to the frame in the first rotational direction applies a torque to the drive shaft in a first torsional direction, and
   wherein rotation of the helical member about the helical axis with respect to the frame in the second rotational direction applies a torque to the drive shaft in a second torsional direction that is opposite the first torsional direction.

10. The system of claim 9, wherein the drive shaft is one of flexible or rigid.

11. The device of claim 1, further comprising:
    a sleeve having at least one internal thread, wherein the sleeve surrounds the helical member, and wherein the at least one internal thread of the sleeve engages the at least one helical depression of the helical member;
    a first one-way bearing positioned concentrically around the sleeve and movable along the sleeve between:
       a first position in which the first one-way bearing engages the sleeve so as to (1) allow the sleeve to rotate about the helical axis with respect to the helical member in a first direction and (2) prevent the sleeve from rotating about the helical axis with respect to the helical member in a second direction that is opposite the first direction, and
       a second position in which the first one-way bearing disengages the sleeve, whereby the sleeve is allowed to rotate about the helical axis with respect to the helical member in the first direction and in the second direction;
    a second one-way bearing positioned concentrically around the sleeve and movable along the sleeve between:
       a first position in which the second one-way bearing engages the sleeve so as to (1) allow the sleeve to rotate about the helical axis with respect to the helical member in the second direction and (2) prevent the sleeve from rotating about the helical axis with respect to the helical member in the first direction, and
       a second position in which the second one-way bearing disengages the sleeve, whereby the sleeve is allowed to rotate about the helical axis with respect to the helical member in the first direction and in the second direction;
    wherein the handle is configured to position the first one-way bearing in the second position of the first one-way bearing and to position the second one-way bearing in the second position of the second one-way bearing when the handle is positioned in its neutral position,
    wherein the handle is configured to position the first one-way bearing in the first position of the first one-way bearing and to positions the second one-way bearing in the second position of the second one-way bearing when the handle is positioned in its forward position,
    wherein the handle is configured to position the first one-way bearing in the second position of the first one-way bearing and to positions the second one-way bearing in the first position of the second one-way bearing when the handle is positioned in its reverse position, wherein the actuator, the sleeve, the first one-way earing, the second one-way bearing, and the helical element are configured such that:

motion of the actuator along the linear axis in the first linear direction causes corresponding motion of the sleeve along the linear axis in the first linear direction;

motion of the actuator along the linear axis in the second linear direction causes corresponding motion of the sleeve along the linear axis in the second linear direction;

motion of the sleeve along the linear axis in the first linear direction while the first one-way bearing is in the first position of the first one-way bearing and the second one-way bearing is in the second position of the second one-way bearing causes the sleeve and the helical member to rotate together about the helical axis with respect to the frame in the first rotational direction;

motion of the sleeve along the linear axis in the second linear direction while the first one-way bearing is in the first position of the first one-way bearing and the second one-way bearing is in the second position of the second one-way bearing causes the sleeve to rotate about the helical axis with respect to the helical member in the second rotational direction;

motion of the sleeve along the linear axis in the first linear direction while the first one-way bearing is in the second position of the first one-way bearing and the second one-way bearing is in the second position of the second one-way bearing causes the sleeve to rotate about the helical axis with respect to the helical member in the first rotational direction;

motion of the sleeve along the linear axis in the second linear direction while the first one-way bearing is in the second position of the first one-way bearing and the second one-way bearing is in the second position of the second one-way bearing causes the sleeve to rotate about the helical axis with respect to the helical member in the second rotational direction;

motion of the sleeve along the linear axis in the first linear direction while the first one-way bearing is in the second position of the first one-way bearing and the second one-way bearing is in the first position of the second one-way bearing causes the sleeve to rotate about the helical axis with respect to the helical member in the first rotational direction;

motion of the sleeve along the linear axis in the second linear direction while the first one-way bearing is in the second position of the first one-way bearing and the second one-way bearing is in the first position of the second one-way bearing causes the sleeve and the helical member to rotate together about the helical axis with respect to the frame in the second rotational direction.

12. The device of claim 1, wherein the device is coupled to a drive train of a vehicle.

13. The device of claim 12, wherein the vehicle is a wheelchair.

* * * * *